(12) United States Patent
Ogata et al.

(10) Patent No.: US 10,107,992 B2
(45) Date of Patent: Oct. 23, 2018

(54) TELEPHOTO LENS AND IMAGE PICKUP APPARATUS USING THE SAME

(71) Applicant: OLYMPUS CORPORATION, Tokyo (JP)

(72) Inventors: Yasuji Ogata, Tokyo (JP); Akiko Naito, Tokyo (JP); Kento Hara, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 277 days.

(21) Appl. No.: 14/842,247

(22) Filed: Sep. 1, 2015

(65) Prior Publication Data
US 2016/0109690 A1    Apr. 21, 2016

(30) Foreign Application Priority Data

Oct. 17, 2014   (JP) ................................. 2014-212600
Feb. 10, 2015   (JP) ................................. 2015-023900

(Continued)

(51) Int. Cl.
*G02B 27/64*    (2006.01)
*G02B 13/02*    (2006.01)
(Continued)

(52) U.S. Cl.
CPC .............. *G02B 13/02* (2013.01); *G02B 7/008* (2013.01); *G02B 13/18* (2013.01); *G02B 15/08* (2013.01);
(Continued)

(58) Field of Classification Search
CPC .... G02B 15/173; G02B 27/646; G02B 13/02; G02B 15/10; G02B 15/14; G02B 27/0062;
(Continued)

(56) References Cited

U.S. PATENT DOCUMENTS 4,871,241 A * 10/1989 Matsuo ................ G02B 15/173
                                                            359/690
5,687,026 A * 11/1997 Sato ..................... G02B 15/173
                                                            359/684
(Continued)

FOREIGN PATENT DOCUMENTS

| CN | 104570300 A | 4/2015 |
| JP | 2007-322986 | 12/2007 |
| JP | 2013-250293 | 12/2013 |

OTHER PUBLICATIONS

Chinese Office Action issued in corresponding Application No. 2015-10547169.3 dated Feb. 13, 2018.
(Continued)

*Primary Examiner* — Bumsuk Won
*Assistant Examiner* — Balram Parbadia
(74) *Attorney, Agent, or Firm* — Hunton Andrews Kurth LLP

(57) ABSTRACT

A telephoto lens includes in order from an object side, a first unit having a positive refractive power, a second unit having a negative refractive power, and a third unit having a positive refractive power, and a focusing from an infinite object point to an object point at a short distance is carried out by moving the second unit toward an image side, and the following conditional expression (17) is satisfied:

$$0.2 < Y_2/Y_{1a} < 0.32 \qquad (17)$$

where,
$Y_2$ denotes a maximum height of an axial light ray on a surface of incidence of the second lens unit, and
$Y_{1a}$ denotes a maximum height of an axial light ray on a surface of incidence of the first lens unit.

22 Claims, 11 Drawing Sheets

(30) Foreign Application Priority Data

| Feb. 10, 2015 | (JP) | ................................. | 2015-023901 |
| Feb. 10, 2015 | (JP) | ................................. | 2015-023902 |
| Feb. 10, 2015 | (JP) | ................................. | 2015-023993 |

(51) Int. Cl.
  *G02B 27/00* (2006.01)
  *G02B 13/18* (2006.01)
  *G02B 15/173* (2006.01)
  *G02B 7/00* (2006.01)
  *G02B 15/08* (2006.01)
  *G02B 15/14* (2006.01)

(52) U.S. Cl.
  CPC ............ *G02B 15/14* (2013.01); *G02B 15/173* (2013.01); *G02B 27/0062* (2013.01); *G02B 27/646* (2013.01)

(58) Field of Classification Search
  CPC ........ G02B 13/18; G02B 15/08; G02B 7/008; G02B 27/64
  See application file for complete search history.

(56) References Cited

U.S. PATENT DOCUMENTS

| 5,737,128 | A | * | 4/1998 | Usui | .................... | G02B 15/173 |
| | | | | | | 359/684 |
| 9,519,124 | B2 | | 12/2016 | Fugikura et al. | | |
| 2005/0248857 | A1 | * | 11/2005 | Wada | ..................... | G02B 13/02 |
| | | | | | | 359/748 |
| 2007/0263299 | A1 | * | 11/2007 | Ohtake | ................ | G02B 15/173 |
| | | | | | | 359/774 |
| 2007/0273980 | A1 | * | 11/2007 | Horiuchi | .............. | G02B 15/173 |
| | | | | | | 359/687 |
| 2009/0034091 | A1 | * | 2/2009 | Sakamoto | .............. | G02B 15/08 |
| | | | | | | 359/687 |
| 2009/0046375 | A1 | * | 2/2009 | Wakazono | ........... | G02B 15/173 |
| | | | | | | 359/688 |
| 2009/0116121 | A1 | * | 5/2009 | Take | .................... | G02B 15/173 |
| | | | | | | 359/687 |
| 2009/0290229 | A1 | * | 11/2009 | Kodaira | ............... | G02B 15/173 |
| | | | | | | 359/688 |
| 2009/0290230 | A1 | * | 11/2009 | Wakazono | ........... | G02B 15/173 |
| | | | | | | 359/688 |
| 2010/0182705 | A1 | * | 7/2010 | Hori | ....................... | G02B 15/10 |
| | | | | | | 359/684 |
| 2013/0271850 | A1 | * | 10/2013 | Shimomura | ........... | G02B 15/14 |
| | | | | | | 359/687 |
| 2015/0109519 | A1 | | 4/2015 | Fugikura et al. | | |

OTHER PUBLICATIONS

Office Action issued in Chinese Patent Application No. 201510547169.3, dated Jun. 13, 2018, 13 pages (English-language translation attached).

* cited by examiner

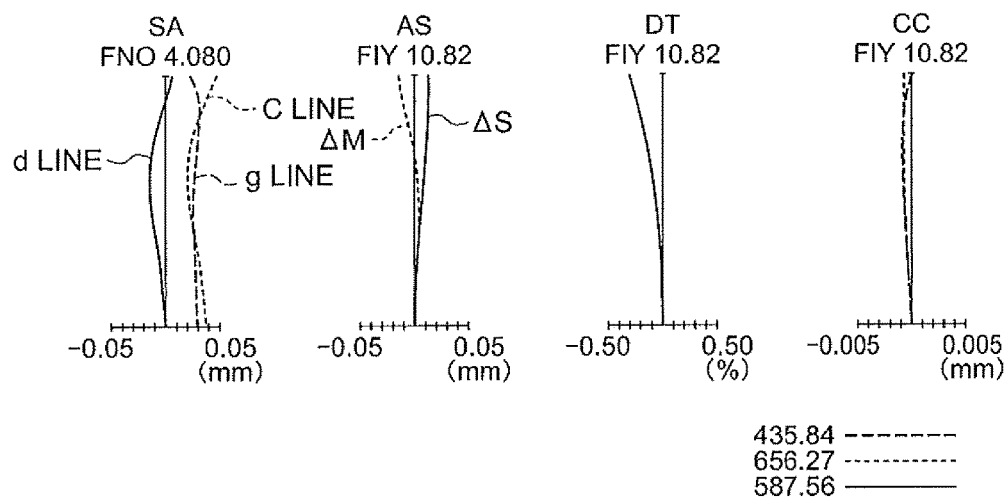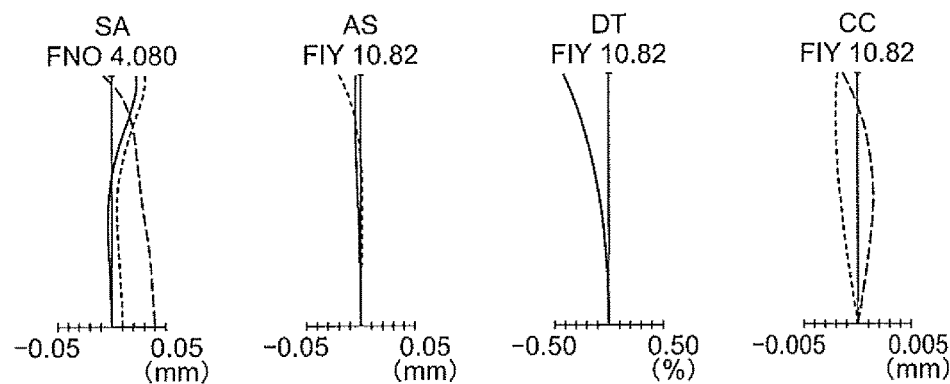

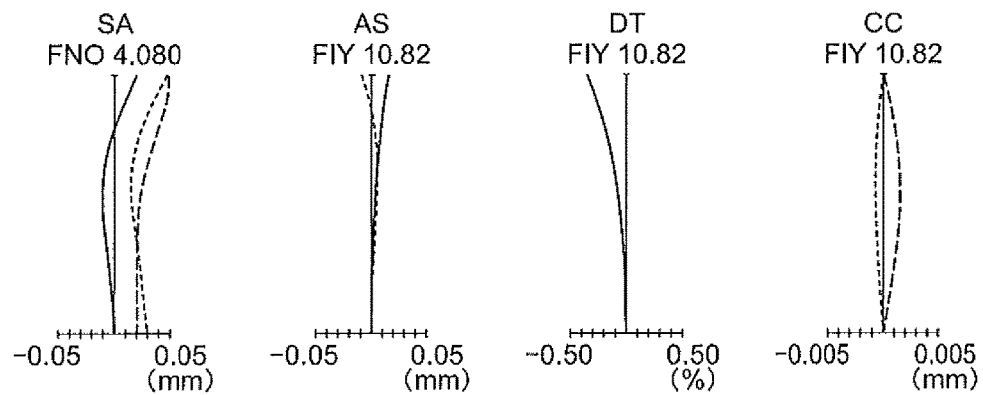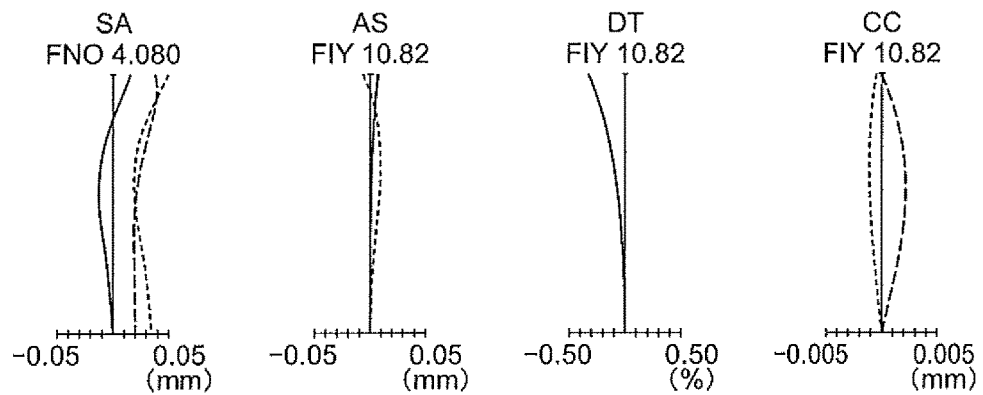

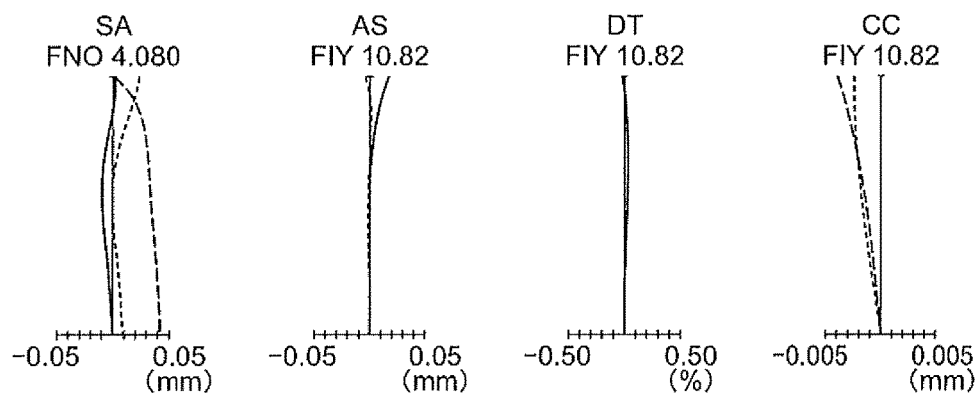
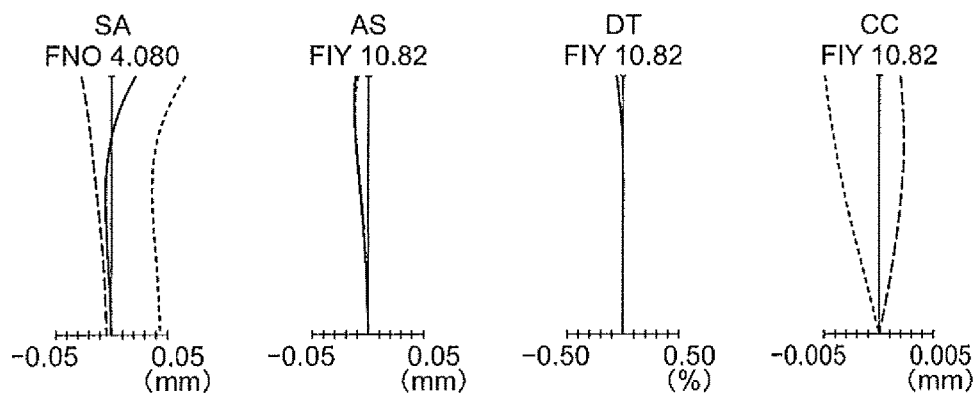

TELEPHOTO LENS AND IMAGE PICKUP APPARATUS USING THE SAME

CROSS-REFERENCE TO RELATED APPLICATION

The present application is based upon and claims the benefit of priority from the prior Japanese Patent Application Nos. 2014-212600 filed on Oct. 17, 2014, 2015-023900 filed on Feb. 10, 2015, 2015-023901 filed on Feb. 10, 2015, 2015-023902 filed on Feb. 10, 2015, and 2015-023993 filed on Feb. 10, 2015; the entire contents of which are incorporated herein by reference.

BACKGROUND OF THE INVENTION

Field of the Invention

The present invention relates to a telephoto lens and an image pickup apparatus using the same. The present invention, in particular, relates to a telephoto lens which is most suitable as an interchangeable lens system application.

Description of the Related Art

In recent years, with the development of digital cameras, various interchangeable lenses for digital cameras have been proposed. For instance, in Japanese Patent Application Laid-open Publication No. 2007-322986, a three-unit arrangement which comprises a positive unit, a negative unit, and a positive unit is disclosed. In this arrangement, a stop is disposed nearest to an image in a first unit, and focusing on an object point at a short distance is carried out by moving a second unit. By making such arrangement, a telephoto lens of 300 mm/F4 for an interchangeable lens application is realized.

Moreover, in Japanese Patent Application Laid-open Publication No. 2013-250293 for instance, a three-unit arrangement which comprises a positive unit, a negative unit, and a positive unit is disclosed. In this arrangement, the focusing is carried out by moving a second unit, and a stop is disposed in a third unit. By making such arrangement, a telephoto lens of a range from 400 mm/F2.8 to 800 mm/F5.6 is realized.

SUMMARY OF THE INVENTION

A telephoto lens according to the present invention comprises in order from an object side to an image side,
a first lens unit having a positive refractive power,
a second lens unit having a negative refractive power, and
a rear lens unit having a positive refractive power.

Moreover, an image pickup apparatus according to the present invention includes
the abovementioned telephoto lens, and
an image pickup element which has an image pickup surface, and which converts an image formed on the image pickup surface by the telephoto lens to an electric signal.

BRIEF DESCRIPTION OF THE DRAWINGS

FIG. 4A, FIG. 4B, FIG. 4C, and FIG. 4D are diagrams showing a spherical aberration (SA), an astigmatism (AS), a distortion (DT), and a chromatic aberration of magnification (CC) of the telephoto lens according to the example 1 at the time of focusing on the infinite object point, and FIG. 4E, FIG. 4F, FIG. 4G, and FIG. 4H are diagrams showing a spherical aberration (SA), an astigmatism (AS), a distortion (DT), and a chromatic aberration of magnification (CC) of the telephoto lens according to the example 2 at the time of focusing on the infinite object point;

FIG. 5A, FIG. 5B, FIG. 5C, and FIG. 5D are diagrams showing a spherical aberration (SA), an astigmatism (AS), a distortion (DT), and a chromatic aberration of magnification (CC) of the telephoto lens according to the example 3 at the time of focusing on the infinite object point, and FIG. 5E, FIG. 5F, FIG. 5G, and FIG. 5H are diagrams showing a spherical aberration (SA), an astigmatism (AS), a distortion (DT), and a chromatic aberration of magnification (CC) of the telephoto lens according to the example 4 at the time of focusing on the infinite object point;

FIG. 6A, FIG. 6B, FIG. 6C, and FIG. 6D are diagrams showing a spherical aberration (SA), an astigmatism (AS), a distortion (DT), and a chromatic aberration of magnification (CC) of the telephoto lens according to the example 5 at the time of focusing on the infinite object point, and FIG. 6E, FIG. 6F, FIG. 6G, and FIG. 6H are diagrams showing a spherical aberration (SA), an astigmatism (AS), a distortion (DT), and a chromatic aberration of magnification (CC) of the telephoto lens according to the example 6 at the time of focusing on the infinite object point;

DETAILED DESCRIPTION OF THE INVENTION

Figure 1A:
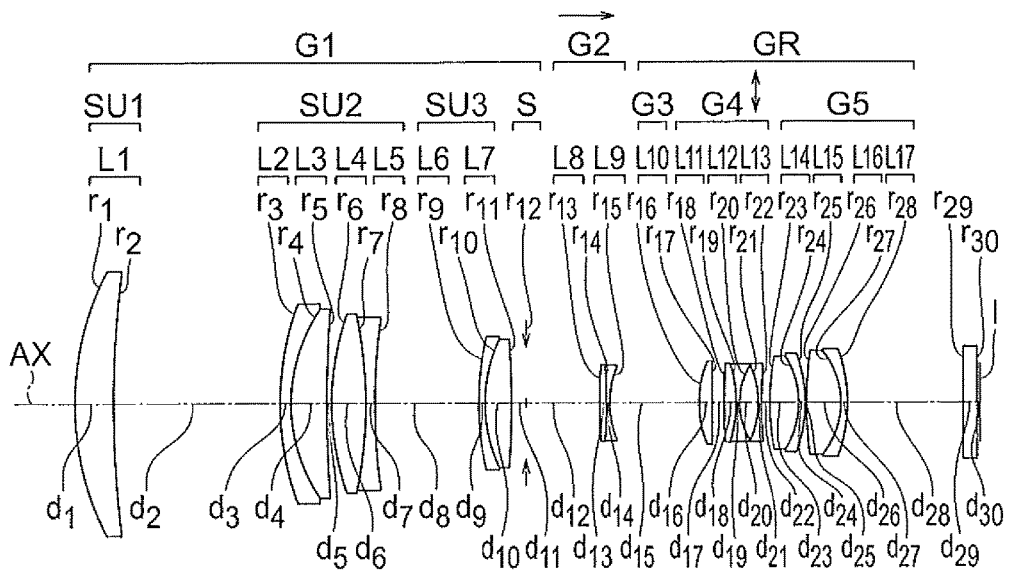
FIG. 1A is a lens cross-sectional view of a telephoto lens according to an example 1 at the time of focusing on an infinite object point.

Prior to explaining examples, action and effect of embodiments according to certain aspects of the present invention will be described below. An action and effect of the present embodiment will be described specifically by describing concrete examples. However, similar to a case of the examples to be described later, the aspects exemplified thereof are some of the aspects included in the present invention, and there is a large number of variations of these aspects. Therefore, the present invention is not restricted to the aspects that are exemplified.

Moreover, in the following description, since arrangements in common have a similar technical significance, the repetitive description thereof will be omitted.

A telephoto lens according to a first aspect of the present embodiment includes in order from an object side to an image side, a first lens unit having a positive refractive power, a second lens unit having a negative refractive power, and a rear lens unit having a positive refractive power, and the first lens unit includes in order from the object side to the image side, a first sub-lens unit, and a second sub-lens unit, and the following conditional expression (1) is satisfied:

$$0.4 < d_{su1o2}/d_{G1} < 0.8 \qquad (1)$$

where, $d_{su1o2}$ denotes a distance on an optical axis from a surface on the object side of a lens positioned nearest to an object of the first sub-lens unit up to a surface on the object side of a lens positioned nearest to the object of the second sub-lens unit, and $d_{G1}$ denotes a distance on the optical axis of a surface on the object side of a lens positioned nearest to the object side of the first lens unit up to a surface on the image side of a lens positioned nearest to the image side of the first lens unit.

For shortening a total length of an overall optical system, it is preferable to make an arrangement of the optical system to be an arrangement of a telephoto type. In the telephoto lens of the present embodiment, since the first lens unit having a positive refractive power and the second lens unit having a negative refractive power are disposed in order of the first lens unit and the second lens unit from the object side to the image side, the optical system includes the arrangement of the telephoto type. Therefore, it is possible to shorten the overall lens length.

Furthermore, the rear lens unit having a positive refractive power is disposed on the image side of the second lens unit. By doing so, it is possible to suppress an occurrence of a spherical aberration, a coma, and an astigmatism by the rear lens unit.

Moreover, by the first lens unit including the first sub-lens unit and the second sub-lens unit, it is possible to suppress an occurrence of the spherical aberration and a chromatic aberration by the two sub-lens units.

Moreover, in the telephoto lens according to the present embodiment, conditional expression (1) is satisfied. Conditional expression (1) is a conditional expression related to a lens diameter of the second sub-lens unit.

By making so as to fall below an upper limit value of conditional expression (1), it is possible to raise a height of alight ray incident on the second sub-lens unit to a certain height while securing an appropriate lens diameter in the second sub-lens unit. Accordingly, it is possible to suppress an occurrence of aberration by the second sub-lens unit. Moreover, since it is possible to suppress the occurrence of aberration by the second sub-lens unit, it is possible to make the number of lenses in the first sub-lens unit small. Or, it is not necessary any more to make a refractive power of the first sub-lens unit small. As a result, it is possible to reduce the total length and a weight of the overall optical system.

By making so as to exceed a lower limit value of conditional expression (1), it is possible to secure appropriately an axial distance between the first sub-lens unit and the second sub-lens unit. In this case, since a height of a light ray incident of the second sub-lens unit becomes low, it is possible to make a lens diameter of the second sub-lens unit small.

Moreover, in the telephoto lens according to the present embodiment, it is preferable that the following conditional expression (2) is satisfied:

$$0.4 < f_{su1}/f < 1.0 \qquad (2)$$

where, $f_{su1}$ denotes a focal length of the first sub-lens unit, and
f denotes a focal length of the overall telephoto lens system at the time of focusing on an infinite object point.

Conditional expression (2) is a conditional expression related to a refractive power of the first sub-lens unit.

By making so as to fall below an upper limit value of conditional expression (2), the refractive power of the first sub-lens unit becomes large. Accordingly, since it is possible to lower a height of a light ray incident on the second sub-lens unit, it is possible to make the second sub-lens unit small-sized and light-weight. Moreover, it is also possible to make the overall lens small-sized and light-weight.

By making so as to exceed a lower limit value of conditional expression (2), since it is possible to make the refractive power of the first sub-lens unit small, it is possible to suppress an occurrence of a spherical aberration of high order.

Moreover, in the telephoto lens of the present embodiment, it is preferable that the following conditional expression (3) is satisfied:

$$4 < f_{su1}/d_{su1i2} < 15 \qquad (3)$$

where, $f_{su1}$ denotes the focal length of the first sub-lens unit, and
$d_{su1i2}$ denotes a distance on an optical axis from a surface on an image of a lens positioned nearest to an image of the first sub-lens unit up to a surface on the object side of a lens positioned nearest to an object of the second sub-lens unit.

By making so as to fall below an upper limit value of conditional expression (3), since it is possible to lower a height of a light ray incident on the second sub-lens unit, it is possible to make the second sub-lens unit small-sized and light-weight. Moreover, it is also possible to make the overall lens small-sized and light-weight.

By making so as to exceed a lower limit value of conditional expression (3), it is possible to make a height of a light ray incident on the second sub-lens unit high to some extent. Therefore, it is possible to reduce various aberrations occurred in the first sub-lens unit by the second sub-lens unit.

Moreover, in the telephoto lens of the present embodiment, it is preferable that the first lens unit has a third sub-lens unit on the image side of the second sub-lens unit.

By making such an arrangement, it is possible to correct favorably a residual aberration (secondary spectrum), or in other words, an aberration that could not be corrected fully in the first sub-lens unit and the second sub-lens unit by the third sub-lens unit.

Moreover, in the telephoto lens of the present embodiment, it is preferable that the refractive power of the first sub-lens unit and a refractive power of the third sub-lens unit are both positive refractive power.

As aforementioned, by making the arrangement of the optical system to be an arrangement of the telephoto type, an effect of shortening the total length of the overall optical system is achieved. By enhancing the positive refractive power of the first lens unit, it is possible to further improve this effect. As a result, it is possible to further shorten the total length of the overall optical system.

By letting both the refractive power of the first sub-lens unit and the refractive power of the third sub-lens unit to be positive refractive power, it is possible to divide the positive refractive power in the first lens unit between the two sub-lens units. Therefore, even when the positive refractive power of the first lens unit is enhanced, it is possible to suppress an occurrence of aberration. As a result, it is possible to maintain favorably an imaging performance of the optical system while further shortening the total length of the overall optical system.

Moreover, in the telephoto lens of the present embodiment, it is preferable that the third sub-lens unit includes at least one positive lens which satisfies the following conditional expression (4):

$$16 < \nu_{su3pmin} < 55 \quad (4)$$

where, $\nu_{su3pmin}$ denotes minimum Abbe's number from among Abbe's numbers for a positive lens in the third sub-lens unit.

By making so as to fall below an upper limit value of conditional expression (4), it is possible to dispose a positive lens with a high dispersion in the third sub-lens unit. Since numerical value of θgF (partial dispersion ratio) is large in a glass with high dispersion, it is possible to make the numerical value of θgF of the positive lens large in the third sub-lens unit. As a result, it is possible to correct favorably the residual aberration (secondary spectrum), or in other words, an aberration that could not be corrected fully in the first sub-lens unit and the second sub-lens unit by the third sub-lens unit.

By making so as to exceed a lower limit value of conditional expression (4), it is possible to select easily a glass material to be used for the positive lens.

Moreover, in the telephoto lens of the present embodiment, it is preferable that the following conditional expression (5) is satisfied:

$$0.35 < f_{su3}/f < 1 \quad (5)$$

where, $f_{su3}$ denotes a focal length of the third sub-lens unit, and
f denotes a focal length of the overall telephoto lens system at the time of focusing on the infinite object point.

By making so as to fall below an upper limit value of conditional expression (5), it is possible to secure sufficiently the positive refractive power in the first lens unit. By making so as to exceed a lower limit value of conditional expression (5), it is possible to suppress an aberration that occurs in the third sub-lens unit.

Moreover, in the telephoto lens of the present embodiment, it is preferable that the first sub-lens unit includes either one single lens or two single lenses.

As the number of lenses in the first sub-lens unit increases, a weight of the overall optical system increases, and the cost increases too. Therefore, it is not preferable to increase the number of lenses in the first sub-lens unit. By making an arrangement such that the first sub-lens unit includes one single lens or two single lenses, it is possible to make the overall optical system light-weight, and to reduce the cost.

Moreover, in the telephoto lens of the present embodiment, it is preferable that the second sub-lens unit includes in order from the object side to the image side, a negative lens, a positive lens, a positive lens, and a negative lens.

In the second sub-lens unit, mainly, correction of the spherical aberration and the chromatic aberration occurred in the first sub-lens unit is carried out. By disposing the negative lens and the positive lens in the second sub-lens unit, it is possible to correct favorably various aberrations, particularly, the spherical aberration and the chromatic aberration without making the positive refractive power of the overall first lens unit remarkably small.

Moreover, in the telephoto lens of the present embodiment, it is preferable that the second sub-lens unit includes a cemented lens which is nearest to the object.

By disposing the cemented lens, it is possible to achieve a large correction effect with respect to the chromatic aberration with the number of surfaces in contact with air let to be same as the number of surfaces of single lenses as they are. In such manner, disposing the cemented lens becomes advantageous for correction of the chromatic aberration.

Moreover, in the telephoto lens of the present embodiment, it is preferable that the second sub-lens unit includes in order from the object side to the image side, an object-side cemented lens and an image-side cemented lens.

As aforementioned, by disposing the cemented lenses, it is possible to achieve a large correction effect with respect to the chromatic aberration with the number of surfaces in contact with air let to be same as the number of surfaces of single lenses as they are. By disposing two cemented lenses, since it is possible to achieve even larger effect of chromatic aberration correction, it is possible to correct the chromatic aberration even more favorably.

Moreover, in the telephoto lens of the present embodiment, it is preferable that the object-side cemented lens in the second sub-lens unit includes in order from the object side to the image side, a negative single lens and a positive single lens, and the image-side cemented lens in the second sub-lens unit includes in order from the object side to the image side, a positive single lens and a negative single lens.

Moreover, in the telephoto lens of the present embodiment, it is preferable that the third sub-lens unit includes one lens component.

Here, the lens component is either a single lens or a cemented lens, and is a lens having two optically effective surfaces which are in contact with air.

In the third sub-lens unit, mainly, correction of a longitudinal chromatic aberration is carried out. Therefore, it is possible to arrange the third sub-lens unit by one lens component. Moreover, even in a case of imparting a positive refractive power to the third sub-lens unit, it is possible to secure sufficient refractive power by one lens component.

By using a cemented lens as the lens component, it is possible to correct favorably the spherical aberration.

Moreover, in the telephoto lens of the present embodiment, it is preferable that the following conditional expression (6) is satisfied:

$$0.42 < d_{G1}/L_{TL} < 0.52 \quad (6)$$

where, $d_{G1}$ denotes a distance on the optical axis from a surface on the object side of a lens positioned nearest to an object in the first lens unit and a surface on the image side of a lens positioned nearest to an image in the first lens unit, and $L_{TL}$ denotes a distance from a surface on the object side of a lens positioned nearest to the object of the telephoto lens up to an image plane at the time of focusing on the infinite object point.

By making so as to fall below an upper limit value of conditional expression (6), it is possible to shorten the overall length of the optical system. By making so as to exceed a lower limit value of conditional expression (6), it is possible to make a size in a radial direction of the first lens unit small. $L_{TL}$ is a distance when not subjected to air conversion.

Moreover, in the telephoto lens of the present embodiment, it is preferable that the following conditional expression (7) is satisfied:

$$1 < d_{su1s}/d_{G1} < 1.2 \quad (7)$$

where, $d_{su1s}$ denotes a distance on the optical axis from a surface on the object side of a lens positioned nearest to the object in the first sub-lens unit up to a stop, and $d_{G1}$ denotes a distance on the optical axis from a surface on the object side of a lens positioned nearest to the object in the first lens unit up to a surface on the image side of a lens positioned nearest to the image in the first lens unit.

By satisfying conditional expression (7), the stop (aperture stop) is positioned between the first lens unit and the second lens unit. As a result, it is possible to simplify a mechanism that drives the stop, and to make a diameter of the overall optical system small.

Moreover, in the telephoto lens of the present embodiment, it is preferable that the rear lens unit includes a third lens unit having a positive refractive power, a fourth lens unit having a negative refractive power, and a fifth lens unit having a positive refractive power.

By the third lens unit having a positive refractive power, it is possible to converge a light ray passed through the first lens unit and the second lens unit by the third lens unit. Accordingly, since it is possible to make small a light beam incident on the fourth lens unit, small-sizing of a lens in the fourth lens unit becomes easy. Moreover, by imparting a positive refractive power to the fifth lens unit, it is possible to make a negative refractive power of the fourth lens unit large.

In such manner, by letting an arrangement of the refractive power in the rear lens unit to be in order of a positive refractive power, a negative refractive power, and a positive refractive power, it is possible to improve Petzval's sum. As a result, it is possible to suppress an occurrence of astigmatism.

Moreover, in the telephoto lens of the present embodiment, it is preferable that the fifth lens unit includes in order from the object side to the image side, an object-side cemented lens and an image-side cemented lens.

The fifth lens unit is to be disposed near an image plane. Therefore, by the fifth lens unit including the two cemented lenses, it is possible make a refractive power of the fifth lens unit large. Accordingly, it is possible to improve Petzval's sum, and at the same time, to correct effectively a chromatic aberration of magnification in a state of an effect on the longitudinal chromatic aberration suppressed to the minimum.

Moreover, in the telephoto lens of the present embodiment, it is preferable that the following conditional expression (8) is satisfied:

$$0.60 < \theta gF_{G5min} < 0.68 \quad (8)$$

where, $\theta gF_{G5min}$ denotes a minimum $\theta gF$ of a negative lens in the fifth lens unit, where, $\theta gF$ is a partial dispersion ratio, and is expressed by $\theta gF=(ng-nF)/(nF-nC)$, where, nC, nF, and ng are refractive indices for a C-line, an F-line, and a g-line respectively.

In general, as dispersion becomes large, partial dispersion ratio also becomes large. By using a glass material with a particularly large dispersion, or in other words, a glass material with a particularly large partial dispersion ratio for a negative lens in the fifth lens unit, it becomes possible to correct favorably the chromatic aberration of magnification on a short wavelength side.

By satisfying conditional expression (8), it is possible to correct the chromatic aberration of magnification on a short wavelength side. Moreover, in lens units other than the fifth lens unit, in a case of using a glass material with a high refractive index and a high dispersion for the positive lens, a range of selection becomes wide. As a result, small-sizing and light-weighting of the overall optical system becomes possible.

By making so as to exceed a lower limit value of conditional expression (8), it is possible to achieve a favorable achromatism effect (tilt correction about the C-line and the F-line), and to make a secondary spectrum small.

Moreover, in the telephoto lens of the present embodiment, it is preferable that the following conditional expression (9) is satisfied:

$$0.05 \leq f_{G5}/f \leq 0.15 \quad (9)$$

where, $f_{G5}$ denotes a focal length of the fifth lens unit, and f denotes a focal length of an overall telephoto lens system at the time of focusing on the infinite object point.

By making so as to fall below an upper limit value of conditional expression (9), it is possible to secure appropriately the refractive power of the fifth lens unit. As a result, it is possible to shorten the total length of the optical system. By making so as to exceed a lower limit value of conditional expression (9), it is possible to suppress the refractive power of the fifth lens unit from becoming excessively large. As a result, it is possible to suppress an occurrence of aberration as well as to secure back focus of an appropriate length at the same time.

Moreover, in the telephoto lens of the present embodiment, it is preferable that the following conditional expression (10) is satisfied:

$$0.65 < L_{TL}/f < 0.95 \quad (10)$$

where, $L_{TL}$ denotes a distance from an object-side surface of a lens positioned nearest to an object of the telephoto lens up to an image plane at the time of focusing on the infinite object point, and f denotes a focal length of an overall telephoto lens system at the time of focusing on the infinite object point.

By making so as to fall below an upper limit value of conditional expression (10), it is possible to shorten the total length of the optical system. By making so as to exceed a lower limit value of conditional expression (10), it is possible to make a refractive power of each lens unit small. Therefore, it is possible to improve an optical performance.

Moreover, in the telephoto lens of the present embodiment, it is preferable that the object-side cemented lens in the fifth lens unit includes in order from the object side to the image side, a positive single lens and a negative single lens, and the image-side cemented lens in the fifth lens unit includes in order from the object side to the image side, a positive single lens and a negative single lens.

By making an arrangement such that the fifth lens unit includes two cemented lenses, it is possible to make the refractive power of the fifth lens unit large upon suppressing an occurrence of a curvature of field, a distortion, and the spherical aberration.

By the fifth lens unit including a plurality of positive lenses, it becomes advantageous for correction of the coma and the chromatic aberration. Moreover, by disposing the positive single lens and the negative single lens in order from the object side to the image side in both the object-side cemented lens and the image-side cemented lens, it is possible to make an angle of incidence of off-axis light on a cemented surface small. Therefore, it is possible to suppress the occurrence of chromatic aberration of magnification.

Moreover, in the telephoto lens of the present embodiment, it is preferable that the fourth lens unit includes a motion-blur reducing lens which moves in a direction perpendicular to an optical axis.

By making an arrangement such that the fifth lens unit includes two cemented lenses, it is possible to enhance the refractive power of the fifth lens unit. As a result, an amount of movement of an image when the fourth lens unit is subjected to decentering becomes large. In other words, it is possible to improve a motion-blur sensitivity of the fourth lens unit. For such reason, it is preferable to dispose the motion-blur reducing lens in the fourth lens unit.

Moreover, in the telephoto lens of the present embodiment, it is preferable that a stop is disposed between the first lens unit and the second lens unit.

By making such arrangement, it is possible to simplify the mechanism for moving the stop and to make the diameter of the overall lens small.

Moreover, in the telephoto lens of the present embodiment, it is preferable that at the time of focusing, the second lens unit moves in an optical axial direction.

By making such arrangement, it is possible to carry out focusing by an inner focusing method. By adopting the inner focusing method, since small-sizing of the overall optical system becomes possible, it becomes possible to make a focusing speed high.

Moreover, in the telephoto lens of the present embodiment, it is preferable that the third lens unit includes one lens component.

Here, the lens component is either a single lens or a cemented lens, and is a lens having two optically effective surfaces which are in contact with air.

By optimizing the shape of lenses and the refractive power of other lens units, it is possible to make an arrangement such that the third lens unit includes the minimum number of lenses. By the third lens unit including one lens component, small-sizing of the overall optical system becomes possible.

Moreover, in the telephoto lens of the present embodiment, it is preferable that the following conditional expression (11) is satisfied:

$$0.4 < f_{G1}/f < 0.5 \quad (11)$$

where, $f_{G1}$ denotes the focal length of the first lens unit, and
f denotes the focal length of the overall telephoto lens system at the time of focusing on the infinite object point.

By making so as to fall below an upper limit value of conditional expression (11), it is possible to secure appropriately the refractive power of the first lens unit. As a result, since it becomes easy to achieve an effect by the arrangement of the telephoto type, it is possible to shorten the total length of the optical system. By making so as to exceed a lower limit value of conditional expression (11), since the positive refractive power in the first lens unit does not become excessively large, it is possible to suppress occurrence of the spherical aberration of high order and the longitudinal chromatic aberration.

Moreover, in the telephoto lens of the present embodiment, it is preferable that the following conditional expression (12) is satisfied:

$$-0.25 < f_{G2}/f < -0.1 \quad (12)$$

where, $f_{G2}$ denotes a focal length of the second lens unit, and
f denotes the focal length of the overall telephoto lens system at the time of focusing on the infinite object point.

By making so as to fall below an upper limit value of conditional expression (12), it is possible to secure appropriately the refractive power of the second lens unit. Moreover, in a case of carrying out focusing by the second lens unit, it is possible to make the refractive power of the second lens unit large. In this case, since it is possible to reduce an amount of movement of the second lens unit at the time of focusing, it is possible to carry out focusing at a high speed.

By making so as to exceed a lower limit value of conditional expression (12), it is possible suppress occurrence of the spherical aberration.

Moreover, in the telephoto lens of the present embodiment, it is preferable that the following conditional expression (13) is satisfied:

$$0.1 < f_{G3}/f < 0.3 \quad (13)$$

where, $f_{G3}$ denotes a focal length of the third lens unit, and
f denotes a focal length of the overall telephoto lens system at the time of focusing on the infinite object point.

In the third lens unit, a light ray that has passed through the first lens unit and the second lens unit is converged further to the positive refractive power. Accordingly, making the lens diameter of the fourth lens unit small is made easy.

By making so as to fall below an upper limit value of conditional expression (13), since it is possible to make the refractive power of the third lens unit large, it is possible to make the diameter of the fourth lens unit even smaller. By making so as to exceed a lower limit value of conditional expression (13), it is possible to suppress occurrence of the spherical aberration and the coma. Moreover, since it is possible to lessen the number of lens components in the third lens unit, it is possible to make the overall optical system small-sized.

Moreover, in the telephoto lens of the present embodiment, it is preferable that the following conditional expression (14) is satisfied:

$$-0.1 < f_{G4}/f < -0.03 \quad (14)$$

where, $f_{G4}$ denotes a focal length of the fourth lens unit, and
f denotes the focal length of the overall telephoto lens system at the time of focusing on the infinite object point.

By making so as to exceed a lower limit value of conditional expression (14), it is possible to make the refractive power of the fourth lens unit large. As a result, it is possible to make the fourth lens unit small-sized. Moreover, in a case in which, the fourth lens unit includes a motion-blur reducing lens, it is possible to improve a sensitivity of motion-blur correction of the fourth lens unit.

By making so as to fall below an upper limit value of conditional expression (14), it is possible to make the refractive power of the fourth lens unit small. As a result, it is possible to suppress an occurrence of various aberrations, and in particular, an occurrence of the spherical aberration, the coma and the distortion.

Moreover, in the telephoto lens of the present embodiment, it is preferable that the first lens unit includes a predetermined cemented lens.

By including the cemented lens, it is possible to achieve a large correction effect with respect to the chromatic aberration. Moreover, assembling of the optical system also becomes easy. Moreover, in a case in which, the second sub-lens unit includes two cemented lenses, the predetermined cemented lens becomes the third cemented lens. In this case, the first lens unit includes three cemented lenses.

Therefore, it is possible to achieve even larger correction effect with respect to the chromatic aberration.

Moreover, in the telephoto lens of the present embodiment, it is preferable that the object-side cemented lens in the second sub-lens unit includes at least one positive lens, and the following conditional expression (15A) is satisfied:

$$85 < v_{sub2op} < 100 \quad (15A)$$

where, $v_{sub2op}$ denotes Abbe's number for at least one positive lens in the object-side cemented lens in the second sub-lens unit.

For shortening the total length of the optical system, it is preferable to make the positive refractive power of the first lens unit as large as possible. Here, it is preferable to use a glass material having a small dispersion and anomalous dispersibility for a glass of the positive lens in the object-side cemented lens in the second sub-lens unit.

By satisfying conditional expression (15A), even in a case in which, the refractive power of the first lens unit is large, it is possible to achieve not only a primary achromatism in the chromatic aberration but also a correction effect with respect to the secondary spectrum.

By making so as to fall below an upper limit value of conditional expression (15A), selection of the glass material to be used for the positive lens becomes easy. By making so as to exceed a lower limit value of conditional expression (15A), it is possible to suppress an occurrence of the chromatic aberration.

Moreover, in the telephoto lens of the present embodiment, it is preferable that the image-side cemented lens in the second sub-lens unit includes at least one positive lens, and the following conditional expression (16A) is satisfied:

$$70 < v_{sub2ip} < 100 \quad (16A)$$

where, $v_{sub2ip}$ denotes Abbe's number for at least one positive lens in the image-side cemented lens in the second sub-lens unit.

For shortening the overall length of the optical system, it is preferable to make the positive refractive power of the first lens unit as large as possible. Here, it is preferable to use a glass material having a small dispersion, and anomalous dispersibility for the glass of the positive lens in the image-side cemented lens in the second sub-lens unit.

By satisfying conditional expression (16A), even in a case in which, the refractive power of the first lens unit is large, it is possible to achieve not only the primary achromatism in the chromatic aberration but also the correction effect with respect to the secondary spectrum.

By making so as to fall below an upper limit value of conditional expression (16A), selection of the glass material to be used for the positive lens becomes easy. By making so as to exceed a lower limit value of conditional expression (16A), it is possible to suppress an occurrence of the chromatic aberration.

Figure 11:
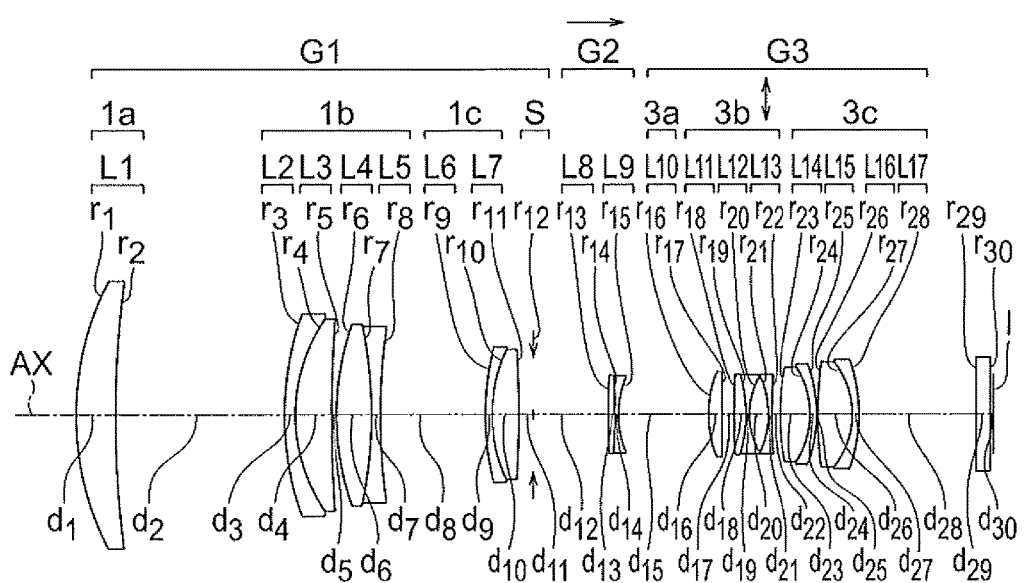
FIG. 11 is a lens cross-sectional view of a telephoto lens according to a second aspect at the time of focusing on the infinite object point.

A lens cross-section of a telephoto lens according to a second aspect of the present embodiment at the time of focusing on the infinite object point is shown in FIG. 11.

The telephoto lens according to the second aspect of the present embodiment includes in order from an object side, a first unit having a positive refractive power, a second unit having a negative refractive power, and a third unit having a positive refractive power, and focusing from an infinite object point to an object point at a short distance is carried out by moving the second unit toward an image side, and the following conditional expression (17) is satisfied:

$$0.2 < Y_2/Y_{1a} < 0.32 \quad (17)$$

where, $Y_2$ denotes a maximum height of an axial light ray on a surface of incidence of the second unit, and $Y_{1a}$ denotes a maximum height of an axial light ray on a surface of incidence of the first unit.

Due to the focal length, a lens diameter of the telephoto lens becomes large. Particularly, a diameter of an incident light beam is determined by specification of the telephoto lens. Therefore, a necessary size is to be secured in accordance with the specification. The telephoto lens of the present embodiment includes three units having a positive refractive power, a negative refractive power, and a positive refractive power, and the focusing is carried out by the second unit. In general, in such arrangement, a diameter of the second unit as well tend to become large, thereby the focusing unit becoming heavy, and a high-speed drive becomes difficult. Therefore, in the telephoto lens of the present embodiment, the so-called inner focusing method is adopted. At the time of focusing, the focusing from the infinite object point up to the object point at a short distance is to be carried out by moving the second unit toward the image side. Accordingly, since it is possible to fix the overall lens length, it is possible to improve operability. In such manner, in the telephoto lens of the present embodiment, it is possible to make the focusing lens unit small-sized and light-weight, as well as to realize a telephoto lens with favorable aberration correction.

Conditional expression (17) is an expression related to a ratio of the maximum height of a light ray of an axial light beam at a surface of incidence of the first unit and the maximum height of a light ray of an axial light beam at a surface of incidence of the second unit. The maximum height of a light ray incident on the first unit is determined by specification of the telephoto lens. Whereas, the maximum height of a light ray incident on the second unit can be designed appropriately.

When exceeding an upper limit value of conditional expression (17), the diameter of the second unit becomes large, and it becomes difficult to make the second unit light-weight. When the height of a light ray is made small till falling below a lower limit value of condition expression (17), it is advantageous for making the second unit light-weight, but, an aberration correction in the first unit becomes difficult. Or, since it leads to an increase in the number of lenses and an increase in the overall length, it is not preferable.

In other words, by making so as to fall below the upper limit value of conditional expression (17), the lens diameter in the second unit does not become excessively large. Therefore, it is possible to make the optical system light-weight. By making so as to exceed the lower limit value of conditional expression (17), an aberration correction in the first unit becomes easy. Moreover, it is possible to prevent an increase in the number of lenses and an increase in the overall length of the optical system. In such manner, by satisfying conditional expression (17), it is possible realize a telephoto lens which is light-weight, and in which, favorable aberration correction is achieved.

It is preferable to dispose a stop nearest to an image in the first unit. Accordingly, the stop is fixed all the time, and also can be disposed near a center of the overall arrangement. As a result, an aberration correction with respect to an off-axis light ray becomes easy.

It is desirable that in the telephoto lens of the present embodiment, the first unit includes in order from the object side, a $1a^{th}$ unit which includes either one lens or two lenses, a $1b^{th}$ unit which includes a cemented lens of a negative lens and a positive lens and a cemented lens of a positive lens and a negative lens, and $1c^{th}$ unit which includes either a single lens or a cemented lens.

The $1a^{th}$ unit has a function of converging an incident light beam, and making small a diameter of a lens on the image side of the $1a^{th}$ unit small. The $1b^{th}$ unit has a function of correcting the spherical aberration and the chromatic aberration about the d-line. It is desirable that a difference in refractive index and a difference in Abbe's number for lenses in each cemented lens in the $1b^{th}$ unit are large. Moreover, it is preferable to use a glass material having a large anomalous dispersibility for the positive lens in each cemented lens in the $1b^{th}$ unit. The $1c^{th}$ unit has a function of an effect of converging a light beam, and correcting coma about the d-line. In a case in which, the $1c^{th}$ unit includes a cemented lens, it is preferable to make a difference in refractive index of two lenses large.

In the telephoto lens of the present embodiment, it is desirable that the following conditional expression (18) is satisfied:

$$0.55 < Y_{1b}/Y_{1a} < 0.85 \qquad (18)$$

where, $Y_{1a}$ denotes the maximum height of an axial light ray on the surface of incidence of the first unit, and $Y_{1b}$ denotes a maximum height of an axial light ray on a surface of incidence of the $1b^{th}$ unit.

Conditional expression (18) is a conditional expression related to a ratio of the maximum height of a light ray of an axial light beam at on a surface of incidence of the $1a^{th}$ unit (surface of incidence of the first unit) and the maximum height of a light ray of an axial light beam at a surface of incidence of the $1b^{th}$ unit. By satisfying conditional expression (18), it is possible to make a diameter of the $1b^{th}$ unit small. Each of the lenses in the cemented lens in the $1b^{th}$ unit is required to have a high machining accuracy. In the telephoto lens of the present embodiment, by making the lens diameter small to satisfy conditional expression (18), it is possible to lower a degree of difficulty of machining of the cemented lens.

When exceeding an upper limit value of conditional expression (18), and the diameter of the $1b^{th}$ unit becomes large, machining of the lens becomes difficult.

When falling below a lower limit value of conditional expression (18), and the diameter becomes small, either the overall lens length becomes large or the aberration correction becomes difficult.

In other words, by making so as to fall below the upper limit value of conditional expression (18), the lens diameter of the $1b^{th}$ unit does not become excessively large. Therefore, machining of lenses becomes easy. By making so as to exceed the lower limit value of conditional expression (18), the lens diameter of the $1b^{th}$ unit does not become excessively small. Therefore, it is possible to prevent an increase in the overall length of the optical system. Or, aberration correction becomes easy.

In the telephoto lens of the present embodiment, it is desirable that the second unit includes a cemented lens. Accordingly, it is possible to correct favorably the chromatic aberration at an object point at a short distance.

In the telephoto lens of the present embodiment, it is desirable that the third unit includes a $3a^{th}$ unit having a positive refractive power, a $3b^{th}$ unit having a negative refractive power, and a $3c^{th}$ unit having a positive refractive power, and the $3b^{th}$ unit includes a motion-blur reducing lens which moves in a direction perpendicular to an optical axis.

By making such arrangement of refractive power in the third unit, it is possible to improve sensitivity at the time of correcting motion blur. Accordingly, it is possible to make small an amount of movement of the $3b^{th}$ unit. As a result, it is possible to correct favorably an aberration at the time of reducing the motion blur. Sensitivity at the time of reducing the motion blur means an amount of fluctuation of an image with respect to an amount of movement of a lens unit.

In the telephoto lens of the present embodiment, it is desirable that the $3a^{th}$ unit includes either a single lens or a cemented lens. Here, by the $3a^{th}$ unit including a cemented lens rather than the $3a^{th}$ unit including a single lens, enables to correct the chromatic aberration more favorably.

In the telephoto lens of the present embodiment, it is desirable that the $3b^{th}$ unit includes a cemented lens of a positive lens and a negative lens, and a negative lens. Accordingly, it is possible to correct favorably the chromatic aberration and the curvature of field, at the time of correcting the motion blur.

In the telephoto lens of the present embodiment, it is desirable that the $3c^{th}$ unit includes a cemented lens of a positive lens and a negative lens, and a cemented lens of a positive lens and a negative lens. By disposing two cemented lenses in the $3c^{th}$ unit, it is possible to correct the chromatic aberration of magnification favorably. Particularly, a favorable effect of an improvement in resolution in a peripheral portion of image field and an improvement in performance of the chromatic aberration correction is achieved.

In the telephoto lens of the present embodiment, it is preferable that the following conditional expression (19) is satisfied:

$$75 < \nu d_{1bp} < 100 \qquad (19)$$

where, $\nu d_{1bp}$ denotes smallest Abbe's number of a positive lens in the $1b^{th}$ unit.

Conditional expression (19) is a conditional expression related to the two positive lenses in the $1b^{th}$ unit, and is a conditional expression that determines Abbe's number for the two positive lenses. When exceeding an upper limit value of conditional expression (19), there is no glass material that can be used for the lens. When falling below a lower limit value of conditional expression (19), there exists no glass material having a large anomalous dispersibility. In other words, by making so as to exceed the lower limit value of conditional expression (19), it is possible to form the positive lens by a glass material having a large anomalous dispersibility. In such manner, in the telephoto lens of the present embodiment, it is possible to correct the chromatic aberration favorably by satisfying conditional expression (19).

In the telephoto lens of the present embodiment, it is desirable that the following conditional expression (20) is satisfied:

$$0.42 < D_{12}/D_1 < 0.75 \qquad (20)$$

where, $D_{12}$ denotes a distance from a surface of incidence of the $1a^{th}$ unit up to a surface of incidence of the $1b^{th}$ unit, and $D_1$ denotes a distance from the surface of incidence of the $1a^{th}$ unit up to a surface of incidence of the $1c^{th}$ unit.

Conditional expression (20) is a conditional expression related to a distance between the $1a^{th}$ unit and the $1b^{th}$ unit. The distance is a distance on an optical axis, and is a distance when not subjected to air conversion. When exceeding an upper limit value of conditional expression (20), a height of a light ray of an axial light beam becomes low. Therefore, correction of the spherical aberration in the optical system from the $1b^{th}$ unit onward becomes difficult. Or, the overall length of the lens becomes long, and therefore it is not preferable.

When falling below a lower limit value of conditional expression (20), it is advantageous for the aberration correction but machining of the $1b^{th}$ unit becomes difficult.

By making so as to fall below the upper limit value of conditional expression (20), the height of the axial light ray does not become excessively low. Therefore, correction of the spherical aberration in a rearward lens unit becomes easy. The rearward lens unit refers to a lens unit positioned on the image side of the $1b^{th}$ unit. Or, it is possible to suppress an increase in the overall length of the optical system. By making so as to exceed the lower limit value of conditional expression (20), machining of a lens in the $1b^{th}$ unit becomes easy. In such manner, in the telephoto lens of the present embodiment, it is possible to realize an ease of machining and favorable aberration correction simultaneously by satisfying conditional expression (20).

As a trend in recent years, there has been an increasing need not only of still images but also of video photography. Therefore, even in interchangeable lens digital cameras, an interchangeable lens which is optimized for video photography function has been sought. Generally, in video photography, it is necessary to maintain a focused state by making an autofocus (AF) work all the time. As a method for this, a so-called wobbling in which, a focusing lens is moved back and forth of a focused position by a minute amount all the time, is carried out. At this time, upon measuring a change in contrast of an image picked up, when a judgment is made that a focusing state has changed, the focusing lens is to be moved appropriately. Moreover, an operation is to be carried out for refocusing. By such wobbling mechanism, even when a distance from an object has changed, it is possible to maintain continuously the focused state all the time.

In wobbling, an extremely high-speed operation is needed according to a frame rate of a body. Therefore, in wobbling, for carrying out an appropriate drive control, light-weighting and lessening of amount of movement of the focusing lens have been sought.

Furthermore, in video photography, an audio recording is carried out simultaneously in many cases. Therefore, at the time of video photography, when there is a generation of sound due to wobbling, the sound generated is recorded as audio. In such manner, minimizing the sound at the time of wobbling has been an important issue.

Normally, in many cases, an arrangement is such that the focusing lens and the wobbling lens are one and the same lens. However, without restricting to such arrangement, sometimes an arrangement is made such that the focusing lens and the wobbling lens are formed as separated lens units.

In such manner, a lens for video photography has many issues that are to be solved. Light-weighting of the focusing lens unit in particular has been sought. The telephoto lens of the present embodiment can also solve such issues, and by using the abovementioned lens arrangement, small-sizing and light-weighting of the focusing unit is realized.

The telephoto lens according to a first aspect may have an arrangement of the telephoto lens according to the second aspect, and may satisfy conditional expressions. Here, a correspondence relationship of arrangement of the optical systems is as follows.

| Telephoto lens according to first aspect | Telephoto lens according to second aspect |
|---|---|
| first lens unit | first unit |
| Second lens unit | second unit |
| rear lens unit | third unit |
| third lens unit | $3a^{th}$ unit |
| fourth lens unit | $3b^{th}$ unit |
| fifth lens unit | $3c^{th}$ unit |
| first sub-lens unit | $1a^{th}$ unit |
| second sub-lens unit | $1b^{th}$ unit |
| third sub-lens unit | $1c^{th}$ unit |

Moreover, a telephoto lens according to a third aspect of the present embodiment includes in order from an object side to an image side, a first lens unit having a positive refractive power, a second lens unit having a negative refractive power, and a rear lens unit having a positive refractive power, and the rear lens unit includes a third lens unit having a positive refractive power, a fourth lens unit having a negative refractive power, and a fifth lens unit having a positive refractive power, and the fifth lens unit includes in order from the object side to the image side, an object-side cemented lens and an image-side cemented lens.

By the third lens unit having a positive refractive power, a light ray passed through the first lens unit and the second lens unit can be converged by the third lens unit. Accordingly, since it is possible to make a light beam that is incident on the fourth lens unit small, it becomes easy to make a diameter of a lens in the fourth lens unit small. Moreover, by imparting a positive refractive power to the fifth lens unit, it becomes possible to make the negative refractive power of the fourth lens unit large.

In such manner, by making an arrangement of refractive power in the rear lens unit to be in order of a positive refractive power, a negative refractive power, and a positive refractive power, it is possible to make Petzval's sum favorable. As a result, it is possible to suppress an occurrence of astigmatism.

Moreover, the fifth lens unit is to be disposed near an image plane. Therefore, by the fifth lens unit including two cemented lenses, it is possible to make the refractive power of the fifth lens unit large. Accordingly, it becomes possible to make Petzval's sum favorable as well as to correct the chromatic aberration of magnification effectively in a state of an effect on the longitudinal chromatic magnification suppressed to be minimum.

The telephoto lens according to the third aspect may have the arrangement of the telephoto lens according to the first aspect and the telephoto lens according to the second aspect, and may satisfy conditional expressions.

Moreover, a telephoto lens according to the fourth aspect of the present embodiment includes in order from an object side to an image side, a first lens unit having a positive refractive power, a second lens unit having a negative refractive power, and a rear lens unit having a positive refractive power, and the rear lens unit includes a third lens unit having a positive refractive power, a fourth lens unit having a negative refractive power, and a fifth lens unit having a positive refractive power, and the first lens unit includes at least one cemented lens, and the following conditional expression (15B) is satisfied:

$$85 < v_{sub2op} < 100 \quad (15B)$$

where, $\nu_{sub2op}$ denotes Abbe's number for at least one positive lens in at least one cemented lens.

By the first lens unit including at least one cemented lens, it is possible to achieve a substantial correction effect with respect to the chromatic aberration. Moreover, assembling of an optical system also becomes easy.

Moreover, for shortening the total length of the optical system, it is preferable to make the positive refractive power of the first lens unit as large as possible. Here, it is preferable to use a glass material having a small dispersion and anomalous dispersibility for a glass of the positive lens in the cemented lens of various examples.

A technical significance of conditional expression (15B) is same as the technical significance of conditional expression (15A).

The telephoto lens according to the fourth aspect may have an arrangement of the telephoto lens according to the first aspect and the telephoto lens according to the second aspect, and may satisfy conditional expressions.

Moreover, a telephoto lens according to a fifth aspect of the present embodiment includes in order from an object side to an image side, a first lens unit having a positive refractive power, a second lens unit having a negative refractive power, and a rear lens unit having a positive refractive power, and the first lens unit includes a first cemented lens and a second cemented lens, and a lens component having a positive refractive power is disposed on the image side of the first cemented lens and the second cemented lens, and the first cemented lens includes at least one positive lens, and the following conditional expression (15C) is satisfied:

$$85 < \nu_{sub2op} < 100 \quad (15C)$$

where, $\nu_{sub2op}$ denotes Abbe's number for at least one positive lens in the first cemented lens, and the lens component is either a single lens or a cemented lens, and is a lens having two optically effective surfaces which are in contact with air.

By disposing a cemented lens in the first lens unit, it is possible to achieve a large correction effect with respect to the chromatic aberration with the number of surfaces in contact with air let to be same as the number of surfaces of single lenses as they are. By disposing two cemented lenses, since it is possible to achieve even larger effect of chromatic aberration correction, it is possible to correct the chromatic aberration even more favorably.

Moreover, for shortening the overall length of the optical system, it is preferable to make the positive refractive power of the first lens unit as large as possible. Here, it is preferable to use a glass material having a small dispersion and anomalous dispersibility for a glass of the positive lens in the first cemented lens.

A technical significance of conditional expression (15C) is same as the technical significance of conditional expression (15A).

In the telephoto lens of the present embodiment, it is preferable that the second cemented lens includes at least one positive lens, and the following conditional expression (16B) is satisfied:

$$70 < \nu_{sub2ip} < 100 \quad (16B)$$

where, $\nu_{sub2ip}$ denotes Abbe's number for at least one positive lens in the second cemented lens.

For shortening the overall length of the optical system, it is preferable to make the positive refractive power of the first lens unit as large as possible. Here, it is preferable to use a glass material having a small dispersion and anomalous dispersibility for a glass of the positive lens in the second cemented lens.

A technical significance of conditional expression (16B) is same as the technical significance of conditional expression (16A).

The telephoto lens according to the fifth aspect may have the arrangement of the telephoto lens according to the first aspect and the telephoto lens according to the second aspect, and may satisfy conditional expressions. Here, a correspondence relationship of cemented lenses is as follows.

| Telephoto lens according to fifth aspect | Telephoto lens according to first aspect |
|---|---|
| first cemented lens | object-side cemented lens in second lens unit |
| second cemented lens | image-side cemented lens in second lens unit |

Moreover, an image pickup apparatus according to the present embodiment includes a telephoto lens according to one of aforementioned embodiments, and an image pickup element which has an image pickup surface, and which converts an image formed on the image pickup surface by the telephoto lens to an electric signal.

Moreover, it is preferable to satisfy mutually the plurality of abovementioned arrangements. Moreover, some of the arrangements may be satisfied simultaneously.

Regarding conditional expressions, an arrangement may be made such that each conditional expression is satisfied separately. It is preferable to make such an arrangement as it becomes easy to achieve each effect.

Moreover, for each conditional expression, the upper limit value and the lower limit value may be changed as described below. It is preferable to do so as it enables to have an effect of each conditional expression even more assuredly.

For conditional expression (1), it is preferable to let the lower limit value to be 0.417, 0.434, and 0.451, and it is preferable to let the upper limit value to be 0.773, 0.746, and 0.719.

For conditional expression (2), it is preferable to let the lower limit value to be 0.422, 0.444, and 0.467, and it is preferable to let the upper limit value to be 0.981, 0.963, and 0.944.

For conditional expression (3), it is preferable to let the lower limit value to be 4.154, 4.307, and 4.461, and it is preferable to let the upper limit value to be 13.865, 12.730, and 11.596.

For conditional expression (4), it is preferable to let the lower limit value to be 18.365, 20.730, and 23.095, and it is preferable to let the upper limit value to be 54.493, 53.985, and 53.478.

For conditional expression (5), it is preferable to let the lower limit value to be 0.356, 0.363, and 0.369, and it is preferable to let the upper limit value to be 0.992, 0.984, and 0.977.

For conditional expression (6), it is preferable to let the lower limit value to be 0.426, 0.432, and 0.439, and it is preferable to let the upper limit value to be 0.519 and 0.518.

For conditional expression (7), it is preferable to let the lower limit value to be 1.005, 1.010, and 1.015, and it is preferable to let the upper limit value to be 1.160, 1.120, and 1.080.

For conditional expression (8), it is preferable to let the lower limit value to be 0.601 and 0.602, and it is preferable to let the upper limit value to be 0.672, 0.665, and 0.657.

For conditional expression (9), it is preferable to let the lower limit value to be 0.063, 0.075, and 0.088, and it is preferable to let the upper limit value to be 0.143, 0.135, and 0.128.

For conditional expression (10), it is preferable to let the lower limit value to be 0.683, 0.716, and 0.750, and it is preferable to let the upper limit value to be 0.932, 0.914, and 0.896.

For conditional expression (11), it is preferable to let the lower limit value to be 0.409, 0.418, and 0.427, and it is preferable to let the upper limit value to be 0.491, 0.482, and 0.473.

For conditional expression (12), it is preferable to let the lower limit value to be −0.231, −0.213, and −0.194, and it is preferable to let the upper limit value to be −0.114, −0.128, and −0.141.

For conditional expression (13), it is preferable to let the lower limit value to be 0.117, 0.134, and 0.151, and it is preferable to let the upper limit value to be 0.281, 0.261, and 0.242.

For conditional expression (14), it is preferable to let the lower limit value to be −0.091, −0.083, and −0.074, and it is preferable to let the upper limit value to be −0.038, −0.045, and −0.053.

For conditional expressions (15A), (15B), and (15C), it is preferable to let the lower limit value to be 87.483, 89.965, and 92.448, and it is preferable to let the upper limit value to be 98.775, 98.000, and 96.000.

For conditional expressions (16A) and (16B), it is preferable to let the lower limit value to be 72.885, 75.770, and 78.655, and it is preferable to let the upper limit value to be 98.775, 98.000, and 96.000.

For conditional expression (17), it is preferable to let the lower limit value to be 0.25, and it is preferable to let the upper limit value to be 0.3 or 0.28.

For conditional expression (18), it is preferable to let the lower limit value to be 0.58 and 0.60, and it is preferable to let the upper limit value to be 0.8 or 0.79.

For conditional expression (19), it is preferable to let the lower limit value to be 76 and 78, and it is preferable to let the upper limit value to be 98 and 96.

For conditional expression (20), it is preferable to let the lower limit value to be 0.43 and 0.46, and it is preferable to let the upper limit value to be 0.73 and 0.70.

Examples from an example 1 to an example 6 of a telephoto lens will be described below. Lens cross-sectional views at the time of focusing on an infinite object point of the examples from the example 1 to the example 6 are shown in FIG. 1A, FIG. 1B, FIG. 2A, FIG. 2B, FIG. 3A, and FIG. 3B respectively. Telephoto lenses in the examples from the example 1 to the example 6 include in order from an object side, a first lens unit G1 having a positive refractive power, a second lens unit G2 having a negative refractive power, and a rear lens unit GR having a positive refractive power. The rear lens unit GR includes a third lens unit G3 having a positive refractive power, a fourth lens unit G4 having a negative refractive power, and a fifth lens unit G5 having a positive refractive power. Focusing from an infinite object point to an object point at a short distance is carried out by moving the second lens unit G2 toward an image side.

Moreover, an aperture stop is denoted by S and an image plane (image pickup surface) is denoted by I. A movement of a lens unit that is moved at the time of focusing is indicated by an arrow mark parallel to an optical axis AX, and a movement of a lens unit that is moved at the time of correcting the motion blur is indicated by an arrow mark perpendicular to the optical axis AX.

A parallel plate which forms a low-pass filter and a cover glass of an electronic image pickup element may be disposed between a lens unit nearest to an image and the image plane I. In this case, a wavelength-region restricting coating which restricts infrared light may be applied to a surface of the parallel plate. Moreover, a multi-layer film for restricting the wavelength region may be applied to a surface of the cover glass. Or a low-pass filter effect may be imparted to the cover glass.

The telephoto lens according to the example 1 will be described below. FIG. 1A shows a cross-sectional view of an arrangement of the telephoto lens according to the example 1.

The first lens unit G1 includes a positive meniscus lens L1 having a convex surface directed toward an object side, a negative meniscus lens L2 having a convex surface directed toward the object side, a positive meniscus lens L3 having a convex surface directed toward the object side, a biconvex positive lens L4, a biconcave negative lens L5, a negative meniscus lens L6 having a convex surface directed toward the object side, a biconvex positive lens L7, and a stop S. Here, the negative meniscus lens L2 and the positive meniscus lens L3 are cemented. The positive lens L4 and the negative lens L5 are cemented. The negative meniscus lens L6 and the positive lens L7 are cemented.

A first sub-lens unit SU1 includes the positive meniscus lens L1. A second sub-lens unit SU2 includes the negative meniscus lens L2, the positive meniscus lens L3, the positive lens L4, and the negative lens L5. A third sub-lens unit SU3 includes the negative meniscus lens L6 and the positive lens L7.

The second lens unit G2 includes a biconvex positive lens L8 and a biconcave negative lens L9. Here, the positive lens L8 and the negative lens L9 are cemented. At the time of focusing on an object point at a short distance, the second lens unit G2 moves monotonously toward an image side.

The third lens unit G3 includes a positive meniscus lens L10 having a convex surface directed toward the object.

The fourth lens unit G4 includes a biconvex positive lens L11, a biconcave negative lens L12, and a biconcave negative lens L13. Here, the positive lens L11 and the negative lens L12 are cemented.

The fifth lens unit G5 includes a biconvex positive lens L14, a negative meniscus lens L15 having a convex surface directed toward the image side, a biconvex positive lens L16, and a negative meniscus lens L17 having a convex surface directed toward the image side. Here, the positive lens L14 and the negative meniscus lens L15 are cemented. The positive lens L16 and the negative meniscus lens L17 are cemented.

Moreover, at the time of correcting the motion blur, the fourth lens unit G4 moves in a direction orthogonal to an optical axis AX.

Figure 1B:
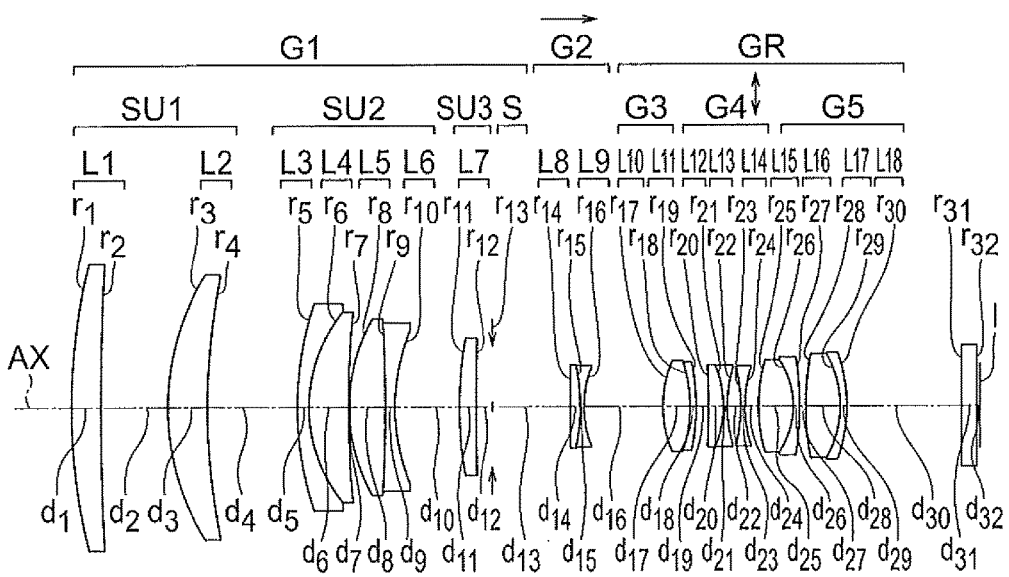
FIG. 1B is a lens cross-sectional view of a telephoto lens according to an example 2 at the time of focusing on the infinite object point.

The telephoto lens according to the example 2 will be described below. FIG. 1B is a cross-sectional view showing an arrangement of the telephoto lens of the example 2.

The first lens unit G1 includes a positive meniscus lens L1 having a convex surface directed toward an object side, a positive meniscus lens L2 having a convex surface directed toward the object side, a negative meniscus lens L3 having a convex surface directed toward the object side, a positive meniscus lens L4 having a convex surface directed toward the object side, a biconvex positive lens L5, a biconcave negative lens L6, a positive meniscus lens L7 having a convex surface directed toward the object side, and a stop S. Here, the negative meniscus lens L3 and the positive meniscus lens L4 are cemented. The positive lens L5 and the negative lens L6 are cemented.

A first sub-lens unit SU1 includes the positive meniscus lens L1 and the positive meniscus lens L2. A second sub-lens unit SU2 includes the negative meniscus lens L3, the positive lens L4, the positive lens L5, and the negative lens L6. A third sub-lens unit SU3 includes the positive meniscus lens L7.

The second lens unit G2 includes a biconvex positive lens L8 and a biconcave negative lens L9. Here, the positive lens L8 and the negative lens L9 are cemented. At the time of focusing on an object point at a short distance, the second lens unit G2 moves monotonously toward an image side.

The third lens unit G3 includes a biconvex positive lens L10 and a negative meniscus lens L11 having a convex surface directed toward the image side. Here, the positive lens L10 and the negative meniscus lens L11 are cemented.

The fourth lens unit G4 includes a positive meniscus lens L12 having a convex surface directed toward the image side, a biconcave negative lens L13, and a biconcave negative lens L14. Here, the positive meniscus lens L12 and the negative lens L13 are cemented.

The fifth lens unit G5 includes a biconvex positive lens L15, a negative meniscus lens L16 having a convex surface directed toward the image side, a biconvex positive lens L17, and a negative meniscus lens L18 having a convex surface directed toward the image side. Here, the positive lens L15 and the negative meniscus lens L16 are cemented. The positive lens L17 and the negative meniscus lens L18 are cemented.

Moreover, at the time of correcting the motion blur, the fourth lens unit G4 moves in a direction orthogonal to an optical axis AX.

Figure 2A:
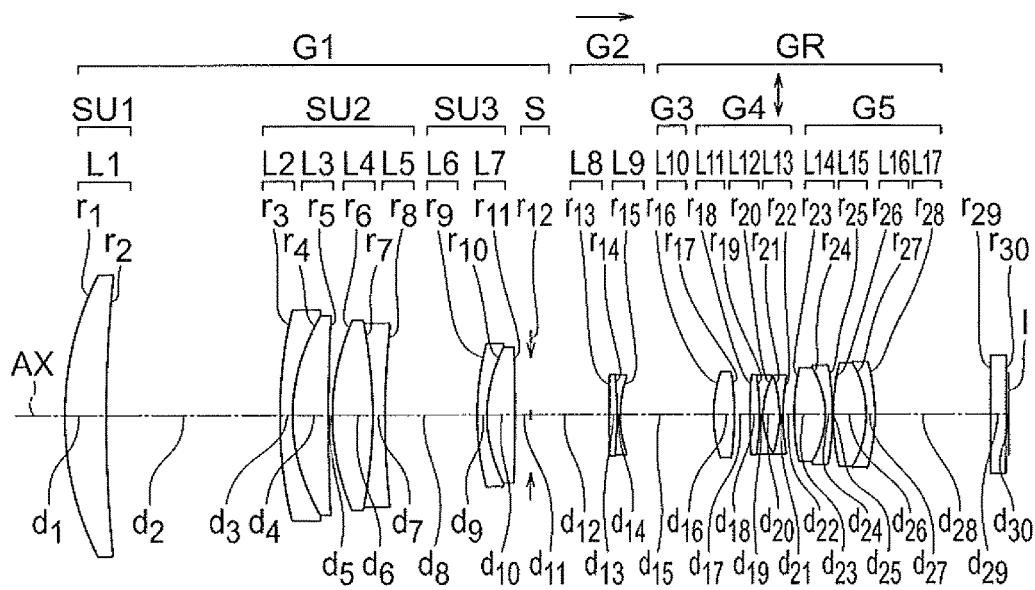
FIG. 2A is a lens cross-sectional view of a telephoto lens according to an example 3 at the time of focusing on the infinite object point.

The telephoto lens of the example 3 will be described below. FIG. 2A is a cross-sectional view showing an arrangement of the telephoto lens of the example 3.

The first lens unit G1 includes a positive meniscus lens L1 having a convex surface directed toward an object side, a negative meniscus lens L2 having a convex surface directed toward the object side, a positive meniscus lens L3 having a convex surface directed toward the object side, a biconvex positive lens L4, a biconcave negative lens L5, a negative meniscus lens L6 having a convex surface directed toward the object side, a biconvex positive lens L7, and a stop S. Here, the negative meniscus lens L2 and the positive meniscus lens L3 are cemented. The positive lens L4 and the negative lens L5 are cemented. The negative meniscus lens L6 and the positive lens L7 are cemented.

A first sub-lens unit SU1 includes the positive meniscus lens L1. A second sub-lens unit SU2 includes the negative meniscus lens L2, the positive meniscus lens L3, the positive lens L4, and the negative lens L5. A third sub-lens unit SU3 includes the negative meniscus lens L6 and the positive lens L7.

The second lens unit G2 includes a biconvex positive lens L8 and a biconcave negative lens L9. Here, the positive lens L8 and the negative lens L9 are cemented. At the time of focusing on an object point at a short distance, the second lens unit G2 moves monotonously toward an image side.

The third lens unit G3 includes a biconvex positive lens L10.

The fourth lens unit G4 includes a biconvex positive lens L11, a biconcave negative lens L12, and a biconcave negative lens L13. Here, the positive lens L11 and the negative lens L12 are cemented.

The fifth lens unit G5 includes a biconvex positive lens L14, a negative meniscus lens L15 having a convex surface directed toward the image side, a biconvex positive lens L16, and a negative meniscus lens L17 having a convex surface directed toward the image side. Here, the positive lens L14 and the negative meniscus lens L15 are cemented. The positive lens L16 and the negative meniscus lens L17 are cemented.

Moreover, at the time of correcting the motion blur, the fourth lens unit G4 moves in a direction orthogonal to an optical axis AX.

Figure 2B:
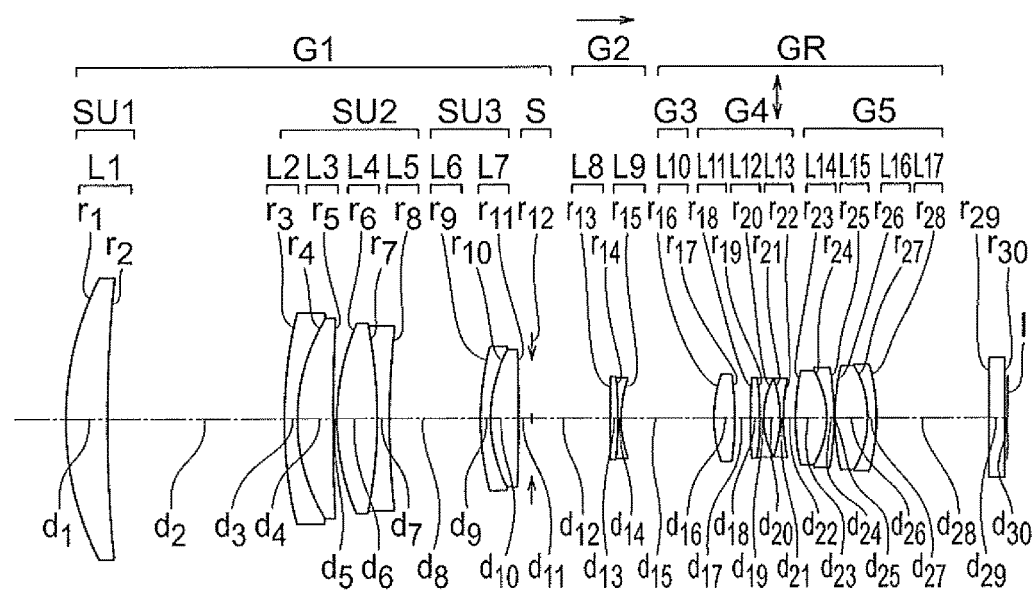
FIG. 2B is a lens cross-sectional view of a telephoto lens according to an example 4 at the time of focusing on the infinite object point.

The telephoto lens of the example 4 will be described below. FIG. 2B is a cross-sectional view showing an arrangement of the telephoto lens of the example 4.

The first lens unit G1 includes a positive meniscus lens L1 having a convex surface directed toward an object side, a negative meniscus lens L2 having a convex surface directed toward the object side, a positive meniscus lens L3 having a convex surface directed toward the object side, a biconvex positive lens L4, a biconcave negative lens L5, a negative meniscus lens L6 having a convex surface directed toward the object side, a biconvex positive lens L7, and a stop S. Here, the negative meniscus lens L2 and the positive meniscus lens L3 are cemented. The positive lens L4 and the negative lens L5 are cemented. The negative meniscus lens L6 and the positive lens L7 are cemented.

A first sub-lens unit SU1 includes the positive meniscus lens L1. A second sub-lens unit SU2 includes the negative meniscus lens L2, the positive meniscus lens L3, the positive lens L4, and the negative lens L5. A third sub-lens unit SU3 includes the negative meniscus lens L6 and the positive lens L7.

The second lens unit G2 includes a biconvex positive lens L8 and a biconcave negative lens L9. Here, the positive lens L8 and the negative lens L9 are cemented. At the time of focusing on an object point at a short distance, the second lens unit G2 moves monotonously toward an image side.

The third lens unit G3 includes a biconvex positive lens L10.

The fourth lens unit G4 includes a biconvex positive lens L11, a biconcave negative lens L12, and a biconcave negative lens L13. Here, the positive lens L11 and the negative lens L12 are cemented.

The fifth lens unit G5 includes a biconvex positive lens L14, a negative meniscus lens L15 having a convex surface directed toward the image side, a biconvex positive lens L16, and a negative meniscus lens L17 having a convex surface directed toward the image side. Here, the positive lens L14 and the negative meniscus lens L15 are cemented. The positive lens L16 and the negative meniscus lens L17 are cemented.

Moreover, at the time of correcting the motion blur, the fourth lens unit G4 moves in a direction orthogonal to an optical axis AX.

Figure 3A:
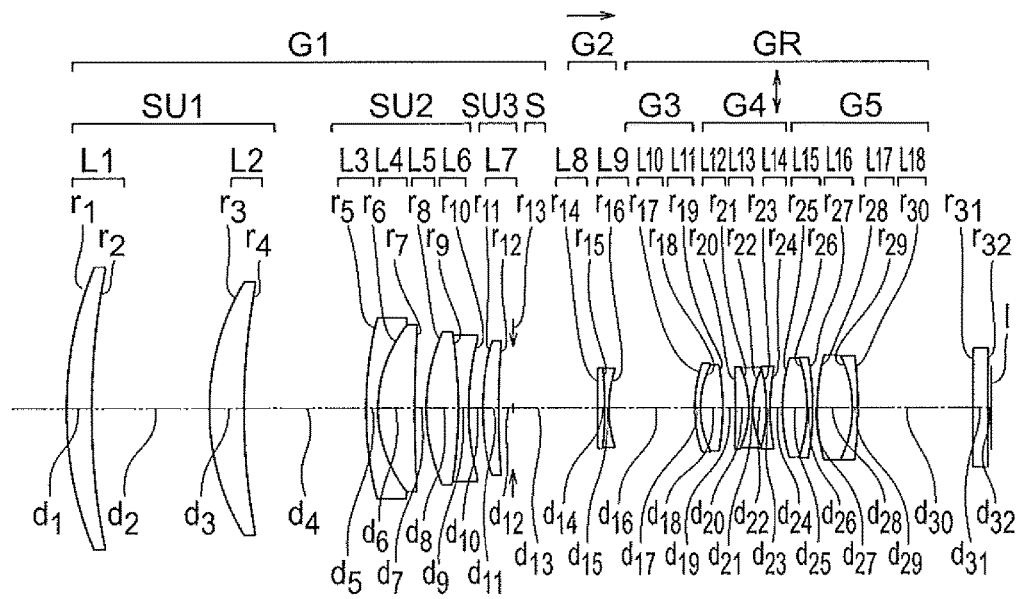
FIG. 3A is a lens cross-sectional view of a telephoto lens according to an example 5 at the time of focusing on the infinite object point.

The telephoto lens of the example 5 will be described below. FIG. 3A is a cross-sectional view showing an arrangement of the telephoto lens of the example 5.

The first lens unit G1 includes a positive meniscus lens L1 having a convex surface directed toward an object side, a positive meniscus lens L2 having a convex surface directed toward the object side, a negative meniscus lens L3 having a convex surface directed toward the object side, a positive meniscus lens L4 having a convex surface directed toward the object side, a biconvex positive lens L5, a biconcave negative lens L6, a positive meniscus lens L7 having a convex surface directed toward the object side, and a stop S. Here, the negative meniscus lens L3 and the positive meniscus lens L4 are cemented. The positive lens L5 and the negative lens L6 are cemented.

A first sub-lens unit SU1 includes the positive meniscus lens L1 and the positive meniscus lens L2. A second sub-lens unit SU2 includes the negative meniscus lens L3, the positive meniscus lens L4, the positive lens L5, and the negative lens L6. A third sub-lens unit SU3 includes the positive meniscus lens L7.

The second lens unit G2 includes a biconvex positive lens L8 and a biconcave negative lens L9. Here, the positive lens L8 and the negative lens L9 are cemented. At the time of focusing on an object point at a short distance, the second lens unit G2 moves monotonously toward an image side.

The third lens unit G3 includes a negative meniscus lens L10 having a convex surface directed toward the object side and a biconvex positive lens L11. Here, the negative meniscus lens L10 and the positive lens L11 are cemented.

The fourth lens unit G4 includes a positive meniscus lens L12 having a convex surface directed toward the image side, a biconcave negative lens L13, and a biconcave negative lens L14. Here, the positive meniscus lens L12 and the negative lens L13 are cemented.

The fifth lens unit G5 includes a biconvex positive lens L15, a negative meniscus lens L16 having a convex surface directed toward the image side, a biconvex positive lens L17, and a negative meniscus lens L18 having a convex surface directed toward the image side. Here, the positive lens L15 and the negative meniscus lens L16 are cemented. The positive lens L17 and the negative meniscus lens L18 are cemented.

Moreover, at the time of correcting the motion blur, the fourth lens unit G4 moves in a direction orthogonal to an optical axis AX.

Figure 3B:
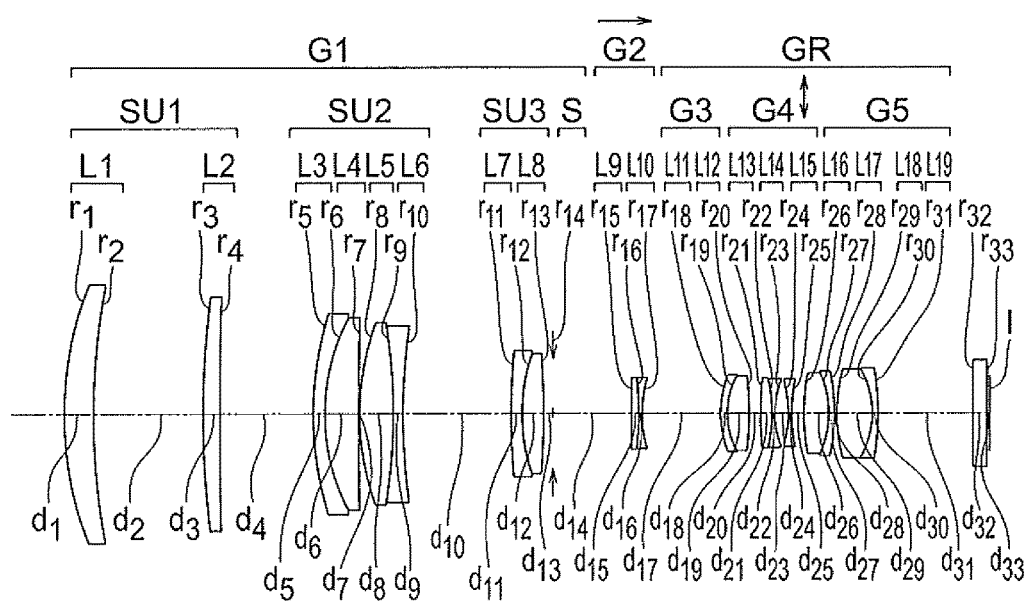
FIG. 3B is a lens cross-sectional view of a telephoto lens according to an example 6 at the time of focusing on the infinite object point.

The telephoto lens of the example 6 will be described below. FIG. 3B is a cross-sectional view showing an arrangement of the telephoto lens of the example 6.

The first lens unit G1 includes a positive meniscus lens L1 having a convex surface directed toward an object side, a positive meniscus lens L2 having a convex surface directed toward the object side, a negative meniscus lens L3 having a convex surface directed toward the object side, a positive meniscus lens L4 having a convex surface directed toward the object side, a biconvex positive lens L5, a biconcave negative lens L6, a negative meniscus lens L7 having a convex surface directed toward the object side, a biconvex positive lens L8, and a stop S. Here, the negative meniscus lens L3 and the positive meniscus lens L4 are cemented. The positive lens L5 and the negative lens L6 are cemented. The negative meniscus lens L7 and the positive lens L8 are cemented.

A first sub-lens unit SU1 includes the positive meniscus lens L1 and a positive meniscus lens L2. A second sub-lens unit SU2 includes the negative meniscus lens L3, the positive meniscus lens L4, the positive lens L5, and the negative lens L6. A third sub-lens unit SU3 includes the negative meniscus lens L7 and the positive lens L8.

The second lens unit G2 includes a biconvex positive lens L9 and a biconcave negative lens L10. Here, the positive lens L9 and the negative lens L10 are cemented. At the time of focusing on an object point at a short distance, the second lens unit G2 moves monotonously toward an image side.

The third lens unit G3 includes a negative meniscus lens L11 having a convex surface directed toward the object side and a biconvex positive lens L12. Here, the negative meniscus lens L11 and the positive lens L12 are cemented.

The fourth lens unit G4 includes a biconvex positive lens L13, a biconcave negative lens L14, and a biconcave negative lens L15. Here, the positive lens L13 and the negative lens L14 are cemented.

The fifth lens unit G5 includes a biconvex positive lens L16, a negative meniscus lens L17 having a convex surface directed toward the image side, a biconvex positive lens L18, and a negative meniscus lens L19 having a convex surface directed toward the image side. Here, the positive lens L16 and the negative meniscus lens L17 are cemented. The positive lens L18 and the negative lens L19 are cemented.

Moreover, at the time of correcting the motion blur, the fourth lens unit G4 moves in a direction orthogonal to an optical axis AX.

Numerical data of each example described above is shown below. Apart from symbols described above, r denotes radius of curvature of each lens surface, d denotes a distance between respective lens surfaces, nd denotes a refractive index of each lens for a d-line, vd denotes an Abbe number for each lens and * denotes an aspheric surface. Further, f denotes a focal length of the entire system, Fno. denotes an F number, ω denotes a half angle of view, IH denotes an image height, BF denotes a back focus, Lens total length is a distance from a forefront lens surface up to a backmost lens surface plus back focus. Further, BF is a unit which is expressed upon air conversion of a distance from the lens backmost surface to a paraxial image surface.

Example 1

Unit mm

Surface data

| Surface no. | r | d | nd | vd |
|---|---|---|---|---|
| 1 | 82.391 | 10.50 | 1.48749 | 70.23 |
| 2 | 280.921 | 45.60 | | |
| 3 | 82.520 | 2.96 | 1.74100 | 52.64 |
| 4 | 47.128 | 9.79 | 1.43700 | 95.10 |
| 5 | 346.425 | 1.30 | | |
| 6 | 74.653 | 9.45 | 1.43700 | 95.10 |
| 7 | −119.184 | 2.38 | 1.80610 | 40.92 |
| 8 | 164.514 | 28.52 | | |
| 9 | 77.016 | 1.90 | 1.77250 | 49.60 |
| 10 | 41.957 | 7.34 | 1.54814 | 45.79 |
| 11 | −263.942 | 3.95 | | |
| 12 (Stop) | ∞ | Variable | | |
| 13 | 164.735 | 1.88 | 1.80810 | 22.76 |
| 14 | −172.861 | 0.97 | 1.71300 | 53.87 |
| 15 | 26.686 | Variable | | |
| 16 | 30.684 | 3.61 | 1.49700 | 81.61 |
| 17 | 529.265 | 3.30 | | |
| 18 | 182.862 | 3.25 | 1.80810 | 22.76 |
| 19 | −38.287 | 0.90 | 1.60311 | 60.64 |
| 20 | 20.648 | 5.08 | | |
| 21 | −26.287 | 0.90 | 1.71300 | 53.87 |
| 22 | 124.505 | 2.28 | | |
| 23 | 60.842 | 8.12 | 1.58313 | 59.38 |
| 24 | −24.754 | 1.80 | 1.92286 | 20.88 |
| 25 | −40.288 | 0.29 | | |
| 26 | 112.212 | 9.46 | 1.72047 | 34.71 |
| 27 | −22.904 | 1.80 | 1.92286 | 20.88 |
| 28 | −44.272 | 31.75 | | |
| 29 | ∞ | 4.00 | 1.51633 | 64.14 |
| 30 | ∞ | 0.80 | | |
| Image plane | ∞ | | | |

-continued

Unit mm

Unit separation

| | Infinite | 1.4 m |
|---|---|---|
| d12 | 20.300 | 37.495 |
| d15 | 24.210 | 7.015 |

Various data (infinite distance)

| | |
|---|---|
| f | 293.94 |
| Fno. | 4.08 |
| 2ω | 4.23° |
| IH | 10.82 |
| BF (in AIR) | 35.19 |
| Lens total length (in AIR) | 247.03 |

Example 2

Unit mm

Surface data

| Surface no. | r | d | nd | νd |
|---|---|---|---|---|
| 1 | 152.697 | 7.35 | 1.48749 | 70.23 |
| 2 | 635.660 | 17.00 | | |
| 3 | 65.873 | 9.98 | 1.49700 | 81.61 |
| 4 | 168.604 | 22.65 | | |
| 5 | 83.128 | 3.00 | 1.83400 | 37.16 |
| 6 | 39.401 | 9.99 | 1.49700 | 81.61 |
| 7 | 247.375 | 0.20 | | |
| 8 | 47.092 | 9.09 | 1.43700 | 95.10 |
| 9 | −375.772 | 2.50 | 1.77250 | 49.60 |
| 10 | 52.273 | 16.34 | | |
| 11 | 103.357 | 4.29 | 1.80518 | 25.46 |
| 12 | 1037.201 | 4.13 | | |
| 13 (Stop) | ∞ | Variable | | |
| 14 | 5156.932 | 2.54 | 1.85478 | 24.80 |
| 15 | −52.053 | 0.90 | 1.71300 | 53.87 |
| 16 | 28.700 | Variable | | |
| 17 | 30.889 | 6.80 | 1.49700 | 81.61 |
| 18 | −37.936 | 1.50 | 1.85478 | 24.80 |
| 19 | −60.988 | 3.10 | | |
| 20 | −230.987 | 3.79 | 1.85478 | 24.80 |
| 21 | −27.890 | 1.00 | 1.69680 | 55.53 |
| 22 | 34.148 | 3.37 | | |
| 23 | −44.563 | 1.00 | 1.58313 | 59.38 |
| 24 | 32.470 | 3.42 | | |
| 25 | 43.045 | 9.01 | 1.64769 | 33.79 |
| 26 | −22.000 | 1.60 | 1.92286 | 20.88 |
| 27 | −88.862 | 1.50 | | |
| 28 | 72.000 | 8.75 | 1.59270 | 35.31 |
| 29 | −26.858 | 1.70 | 1.92286 | 20.88 |
| 30 | −40.716 | 29.05 | | |
| 31 | ∞ | 4.00 | 1.51633 | 64.14 |
| 32 | ∞ | 0.80 | | |
| Image plane | ∞ | | | |

Unit separation

| | Infinite | 1.4 m |
|---|---|---|
| d13 | 20.000 | 37.439 |
| d16 | 19.840 | 2.401 |

Various data (infinite distance)

| | |
|---|---|
| f | 294.10 |
| Fno. | 4.080 |
| 2ω | 4.23° |
| IH | 10.82 |

-continued

Unit mm

| BF (in AIR) | 32.49 |
|---|---|
| Lens total length (in AIR) | 228.83 |

Example 3

Unit mm

Surface data

| Surface no. | r | d | nd | νd |
|---|---|---|---|---|
| 1 | 83.614 | 10.60 | 1.48749 | 70.23 |
| 2 | 354.620 | 44.96 | | |
| 3 | 121.115 | 3.20 | 1.73400 | 51.47 |
| 4 | 51.291 | 9.20 | 1.43875 | 94.93 |
| 5 | 492.362 | 1.00 | | |
| 6 | 63.414 | 10.48 | 1.43875 | 94.93 |
| 7 | −127.021 | 3.06 | 1.80610 | 40.92 |
| 8 | 204.246 | 23.99 | | |
| 9 | 73.423 | 2.67 | 1.73400 | 51.47 |
| 10 | 38.139 | 7.38 | 1.54814 | 45.79 |
| 11 | −653.693 | 4.07 | | |
| 12 (Stop) | ∞ | Variable | | |
| 13 | 684.319 | 2.10 | 1.80810 | 22.76 |
| 14 | −99.610 | 0.80 | 1.71300 | 53.87 |
| 15 | 30.683 | Variable | | |
| 16 | 35.344 | 5.38 | 1.43875 | 94.93 |
| 17 | −90.808 | 3.94 | | |
| 18 | 181.821 | 2.45 | 1.92286 | 18.90 |
| 19 | −68.416 | 0.90 | 1.61800 | 63.40 |
| 20 | 21.925 | 4.19 | | |
| 21 | −34.422 | 0.90 | 1.71300 | 53.87 |
| 22 | 54.789 | 3.11 | | |
| 23 | 57.947 | 7.94 | 1.74951 | 35.33 |
| 24 | −24.316 | 1.80 | 1.92286 | 20.88 |
| 25 | −82.795 | 0.20 | | |
| 26 | 60.000 | 8.58 | 1.65412 | 39.68 |
| 27 | −26.918 | 2.30 | 1.92286 | 20.88 |
| 28 | −50.468 | 30.12 | | |
| 29 | ∞ | 4.00 | 1.51633 | 64.14 |
| 30 | ∞ | 0.80 | | |
| Image plane | ∞ | | | |

Unit separation

| | Infinite | 1.4 m |
|---|---|---|
| d12 | 20.350 | 37.180 |
| d15 | 24.090 | 7.260 |

Various data (infinite distance)

| | |
|---|---|
| f | 291.04 |
| Fno. | 4.08 |
| 2ω | 4.27° |
| IH | 10.82 |
| BF (in AIR) | 33.56 |
| Lens total length (in AIR) | 243.20 |

Example 4

Unit mm

Surface data

| Surface no. | r | d | nd | νd |
|---|---|---|---|---|
| 1 | 84.042 | 10.54 | 1.48749 | 70.23 |
| 2 | 355.169 | 45.98 | | |
| 3 | 117.315 | 3.20 | 1.73400 | 51.47 |

-continued

Unit mm

| | | | | |
|---|---|---|---|---|
| 4 | 50.625 | 9.17 | 1.43875 | 94.93 |
| 5 | 436.317 | 1.00 | | |
| 6 | 62.921 | 10.37 | 1.43875 | 94.93 |
| 7 | −126.963 | 3.06 | 1.80610 | 40.92 |
| 8 | 220.101 | 23.97 | | |
| 9 | 77.092 | 2.61 | 1.73400 | 51.47 |
| 10 | 39.084 | 7.18 | 1.54814 | 45.79 |
| 11 | −608.540 | 3.53 | | |
| 12 (Stop) | ∞ | Variable | | |
| 13 | 785.048 | 2.10 | 1.80810 | 22.76 |
| 14 | −97.884 | 0.80 | 1.71300 | 53.87 |
| 15 | 30.770 | Variable | | |
| 16 | 35.022 | 5.52 | 1.43875 | 94.93 |
| 17 | −88.540 | 3.94 | | |
| 18 | 272.276 | 2.45 | 1.92286 | 20.88 |
| 19 | −57.482 | 0.90 | 1.61800 | 63.40 |
| 20 | 22.993 | 3.96 | | |
| 21 | −35.578 | 0.90 | 1.69680 | 55.53 |
| 22 | 47.710 | 3.28 | | |
| 23 | 55.325 | 8.11 | 1.74951 | 35.33 |
| 24 | −23.482 | 1.80 | 1.92286 | 20.88 |
| 25 | −79.458 | 0.30 | | |
| 26 | 55.293 | 8.49 | 1.59551 | 39.24 |
| 27 | −27.707 | 2.30 | 1.92286 | 20.88 |
| 28 | −47.799 | 29.45 | | |
| 29 | ∞ | 4.00 | 1.51633 | 64.14 |
| 30 | ∞ | 0.80 | | |
| Image plane | ∞ | | | |

Unit separation

| | Infinite | 1.4 m |
|---|---|---|
| d12 | 20.300 | 37.137 |
| d15 | 23.990 | 7.153 |

Various data (infinite distance)

| | |
|---|---|
| f | 291.00 |
| Fno. | 4.08 |
| 2ω | 4.27° |
| IH | 10.82 |
| BF (in AIR) | 32.89 |
| Lens total length (in AIR) | 242.64 |

Example 5

Unit mm

Surface data

| Surface no. | r | d | nd | vd |
|---|---|---|---|---|
| 1 | 100.000 | 6.30 | 1.48749 | 70.23 |
| 2 | 185.738 | 30.22 | | |
| 3 | 65.495 | 8.86 | 1.49700 | 81.61 |
| 4 | 182.775 | 31.49 | | |
| 5 | 102.065 | 3.00 | 1.83400 | 37.16 |
| 6 | 35.358 | 9.46 | 1.49700 | 81.61 |
| 7 | 353.069 | 3.03 | | |
| 8 | 50.366 | 8.26 | 1.43700 | 95.10 |
| 9 | −127.828 | 2.60 | 1.77250 | 49.60 |
| 10 | 68.292 | 3.78 | | |
| 11 | 60.689 | 4.19 | 1.80518 | 25.46 |
| 12 | 184.940 | 3.74 | | |
| 13(Stop) | ∞ | Variable | | |
| 14 | 3189.272 | 1.86 | 1.84666 | 23.78 |
| 15 | −102.991 | 1.00 | 1.77250 | 49.60 |
| 16 | 33.769 | Variable | | |
| 17 | 36.244 | 1.50 | 1.84666 | 23.78 |
| 18 | 25.239 | 5.84 | 1.49700 | 81.61 |
| 19 | −65.798 | 3.29 | | |
| 20 | −231.178 | 3.35 | 1.80518 | 25.46 |

-continued

Unit mm

| | | | | |
|---|---|---|---|---|
| 21 | −26.952 | 1.00 | 1.69680 | 55.53 |
| 22 | 25.434 | 3.38 | | |
| 23 | −44.292 | 1.00 | 1.58313 | 59.38 |
| 24 | 58.276 | 3.30 | | |
| 25 | 47.386 | 6.21 | 1.64769 | 33.79 |
| 26 | −44.237 | 1.50 | 1.92286 | 18.90 |
| 27 | −72.107 | 1.11 | | |
| 28 | 55.076 | 9.00 | 1.69895 | 30.13 |
| 29 | −30.980 | 1.50 | 1.92286 | 18.90 |
| 30 | −100.926 | 29.84 | | |
| 31 | ∞ | 4.00 | 1.51633 | 64.14 |
| 32 | ∞ | 0.80 | | |
| Image plane | ∞ | | | |

Unit separation

| | Infinite | 1.4m |
|---|---|---|
| d13 | 21.850 | 39.351 |
| d16 | 22.000 | 4.499 |

Various data (infinite distance)

| | |
|---|---|
| f | 294.00 |
| Fno. | 4.08 |
| 2ω | 4.21° |
| IH | 10.82 |
| BF(in AIR) | 33.28 |
| Lens total length(in AIR) | 236.90 |

Example 6

Unit mm

Surface data

| Surface no. | r | d | nd | vd |
|---|---|---|---|---|
| 1 | 100.000 | 8.00 | 1.48749 | 70.23 |
| 2 | 190.479 | 30.50 | | |
| 3 | 275.922 | 4.66 | 1.49700 | 81.54 |
| 4 | 1341.851 | 26.00 | | |
| 5 | 96.636 | 3.20 | 1.83481 | 42.71 |
| 6 | 58.200 | 9.57 | 1.49700 | 81.54 |
| 7 | 2218.640 | 0.20 | | |
| 8 | 76.585 | 9.39 | 1.43875 | 94.93 |
| 9 | −156.187 | 2.60 | 1.75500 | 52.32 |
| 10 | 163.211 | 30.47 | | |
| 11 | 204.208 | 3.00 | 1.69100 | 54.82 |
| 12 | 53.155 | 6.00 | 1.57135 | 52.97 |
| 13 | −239.111 | 2.68 | | |
| 14 (Stop) | ∞ | Variable | | |
| 15 | 632.607 | 2.03 | 1.85478 | 24.80 |
| 16 | −95.464 | 0.90 | 1.75500 | 52.32 |
| 17 | 34.618 | Variable | | |
| 18 | 29.238 | 1.85 | 1.85478 | 24.80 |
| 19 | 22.213 | 6.00 | 1.48749 | 70.23 |
| 20 | −96.295 | 3.10 | | |
| 21 | 100.398 | 3.18 | 1.85478 | 24.80 |
| 22 | −45.430 | 0.90 | 1.72916 | 54.68 |
| 23 | 24.049 | 3.79 | | |
| 24 | −34.481 | 0.90 | 1.69680 | 55.53 |
| 25 | 46.160 | 3.30 | | |
| 26 | 57.204 | 6.85 | 1.60300 | 65.44 |
| 27 | −28.719 | 1.60 | 1.83400 | 37.16 |
| 28 | −56.678 | 0.64 | | |
| 29 | 48.060 | 10.00 | 1.61340 | 44.27 |
| 30 | −24.953 | 1.50 | 1.69895 | 30.13 |
| 31 | −83.250 | 26.79 | | |

-continued

Unit mm

| | | | | |
|---|---|---|---|---|
| 32 | ∞ | 4.00 | 1.51633 | 64.14 |
| 33 | ∞ | 0.80 | | |
| Image plane | ∞ | | | |

Unit separation

| | Infinite | 1.4 m |
|---|---|---|
| d14 | 21.850 | 41.737 |
| d17 | 22.000 | 2.113 |

Various data (infinite distance)

| | |
|---|---|
| f | 294.00 |
| Fno. | 4.08 |
| 2ω | 4.22° |
| IH | 10.82 |
| BF (in AIR) | 30.23 |
| Lens total length (in AIR) | 256.89 |

Aberration diagrams of the examples from the example 1 to the example 6 are shown in FIG. 4A, FIG. 4B, FIG. 4C, FIG. 4D, FIG. 4E, FIG. 4F, FIG. 4G, and FIG. 4H to FIG. 6A, FIG. 6B, FIG. 6C, FIG. 6D, FIG. 6E, FIG. 6F, FIG. 6G, and FIG. 6H respectively. Aberration diagrams at the time of focusing on an infinite object point are shown for one example. Moreover, in each diagram, FIY denotes the maximum image height.

In these aberration diagrams, FIG. 4A, FIG. 4E, FIG. 5A, FIG. 5E, FIG. 6A, and FIG. 6E show a spherical aberration (SA), FIG. 4B, FIG. 4F, FIG. 5B, FIG. 5F, FIG. 6B, and FIG. 6F show an astigmatism (AS), FIG. 4C, FIG. 4G, FIG. 5C, FIG. 5G, FIG. 6C, and FIG. 6G show a distortion (DT), and FIG. 4D, FIG. 4H, FIG. 5D, FIG. 5H, FIG. 6D, and FIG. 6H show a chromatic aberration of magnification (CC) respectively.

Next, the values of conditional expressions in each example are shown below.

| Conditional Expressions | Example1 | Example2 | Example3 |
|---|---|---|---|
| (1) $d_{su1o2}/d_{G1}$ | 0.469 | 0.556 | 0.477 |
| (2) $f_{su1}/f$ | 0.800 | 0.489 | 0.762 |
| (3) $f_{su1}/d_{su1i2}$ | 5.155 | 6.344 | 4.929 |
| (4) $v_{su3pmin}$ | 45.79 | 25.46 | 45.79 |
| (5) $f_{su3}/f$ | 0.504 | 0.484 | 0.572 |
| (6) $d_{G1}/L_{TL}$ | 0.482 | 0.445 | 0.477 |
| (7) $d_{su1s}/d_{G1}$ | 1.033 | 1.040 | 1.035 |
| (8) $\theta gF_{G5min}$ | 0.639 | 0.639 | 0.639 |
| (9) $f_{G5}/f$ | 0.100 | 0.120 | 0.104 |
| (10) $L_{TL}/f$ | 0.845 | 0.783 | 0.840 |
| (11) $f_{G1}/f$ | 0.436 | 0.442 | 0.438 |
| (12) $f_{G2}/f$ | −0.162 | −0.155 | −0.163 |
| (13) $f_{G3}/f$ | 0.222 | 0.168 | 0.202 |
| (14) $f_{G4}/f$ | −0.062 | −0.065 | −0.063 |
| (15A) $v_{sub2op}$ | 95.10 | 81.61 | 94.93 |
| (15B) $v_{sub2op}$ | 95.10 | 81.61 | 94.93 |
| (15C) $v_{sub2op}$ | 95.10 | 81.61 | 94.93 |
| (16A) $v_{sub2ip}$ | 95.10 | 95.10 | 94.93 |
| (16B) $v_{sub2ip}$ | 95.10 | 95.10 | 94.93 |
| (17) $Y_2/Y_{1a}$ | 0.266 | 0.272 | 0.272 |
| (18) $Y_{1b}/Y_{1a}$ | 0.755 | 0.721 | 0.753 |
| (19) $vd_{1bp}$ | 95.10 | 81.61 | 94.93 |
| (20) $D_{12}/D_1$ | 0.469 | 0.556 | 0.477 |

| Conditional Expressions | Example4 | Example5 | Example6 |
|---|---|---|---|
| (1) $d_{su1o2}/d_{G1}$ | 0.483 | 0.691 | 0.518 |
| (2) $f_{su1}/f$ | 0.766 | 0.494 | 0.925 |
| (3) $f_{su1}/d_{su1i2}$ | 4.850 | 4.614 | 10.461 |
| (4) $v_{su3pmin}$ | 45.79 | 25.46 | 52.97 |
| (5) $f_{su3}/f$ | 0.603 | 0.376 | 0.969 |
| (6) $d_{G1}/L_{TL}$ | 0.480 | 0.467 | 0.517 |
| (7) $d_{su1s}/d_{G1}$ | 1.030 | 1.034 | 1.020 |
| (8) $\theta gF_{G5min}$ | 0.639 | 0.650 | 0.603 |
| (9) $f_{G5}/f$ | 0.105 | 0.104 | 0.105 |
| (10) $L_{TL}/f$ | 0.838 | 0.810 | 0.878 |
| (11) $f_{G1}/f$ | 0.438 | 0.438 | 0.464 |
| (12) $f_{G2}/f$ | −0.163 | −0.156 | −0.176 |
| (13) $f_{G3}/f$ | 0.199 | 0.201 | 0.191 |
| (14) $f_{G4}/f$ | −0.063 | −0.065 | −0.061 |
| (15A) $v_{sub2op}$ | 94.93 | 81.61 | 81.54 |
| (15B) $v_{sub2op}$ | 94.93 | 81.61 | 81.54 |
| (15C) $v_{sub2op}$ | 94.93 | 81.61 | 81.54 |
| (16A) $v_{sub2ip}$ | 94.93 | 95.10 | 94.93 |
| (16B) $v_{sub2ip}$ | 94.93 | 95.10 | 94.93 |
| (17) $Y_2/Y_{1a}$ | 0.271 | 0.260 | 0.269 |
| (18) $Y_{1b}/Y_{1a}$ | 0.749 | 0.641 | 0.783 |
| (19) $vd_{1bp}$ | 94.93 | 81.61 | 81.54 |
| (20) $D_{12}/D_1$ | 0.483 | 0.691 | 0.518 |

Figure 7:
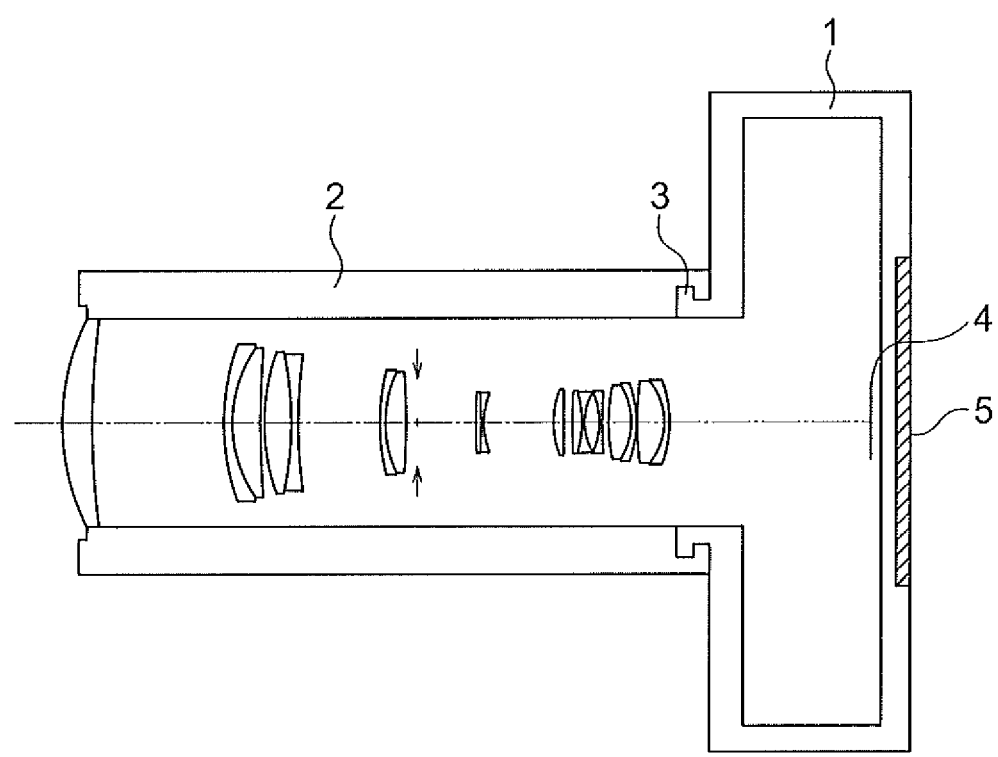
FIG. 7 is a cross-sectional view of an image pickup apparatus.

FIG. 7 is a cross-sectional view of a single-lens mirrorless camera as an electronic image pickup apparatus. In FIG. 7, a photographic lens system 2 is disposed inside a lens barrel of a single-lens mirrorless camera 1. A mount portion 3 enables the photographic lens system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic lens system 2 of the single-lens mirrorless camera 1, the telephoto lens described in any one of the examples from the first example to the sixth example is to be used.

Figure 8:
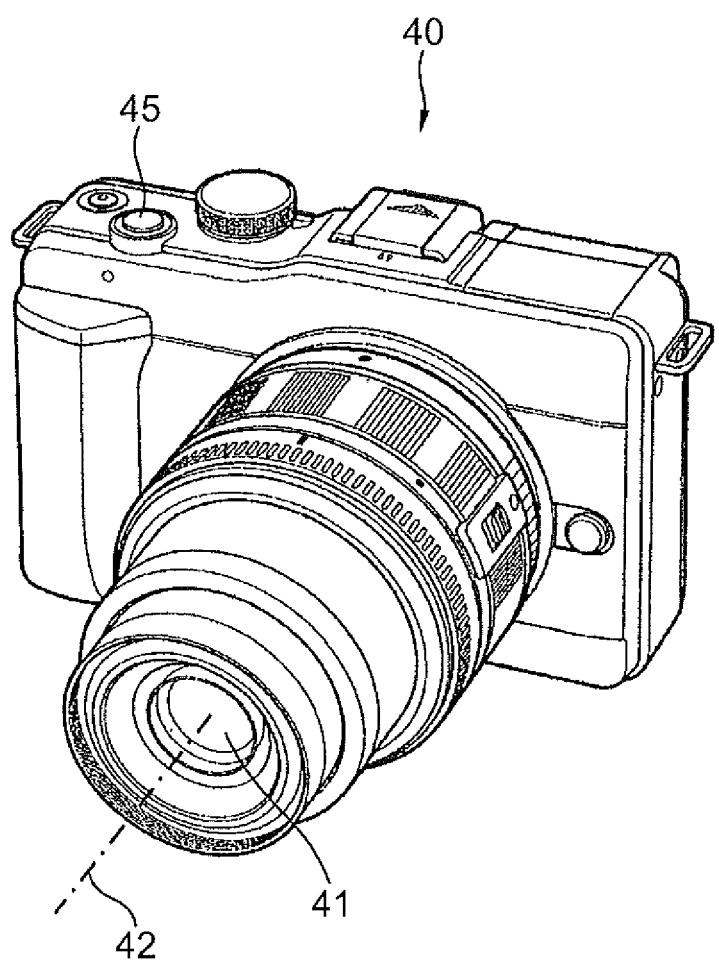
FIG. 8 is a front perspective view of the image pickup apparatus.
Figure 9:
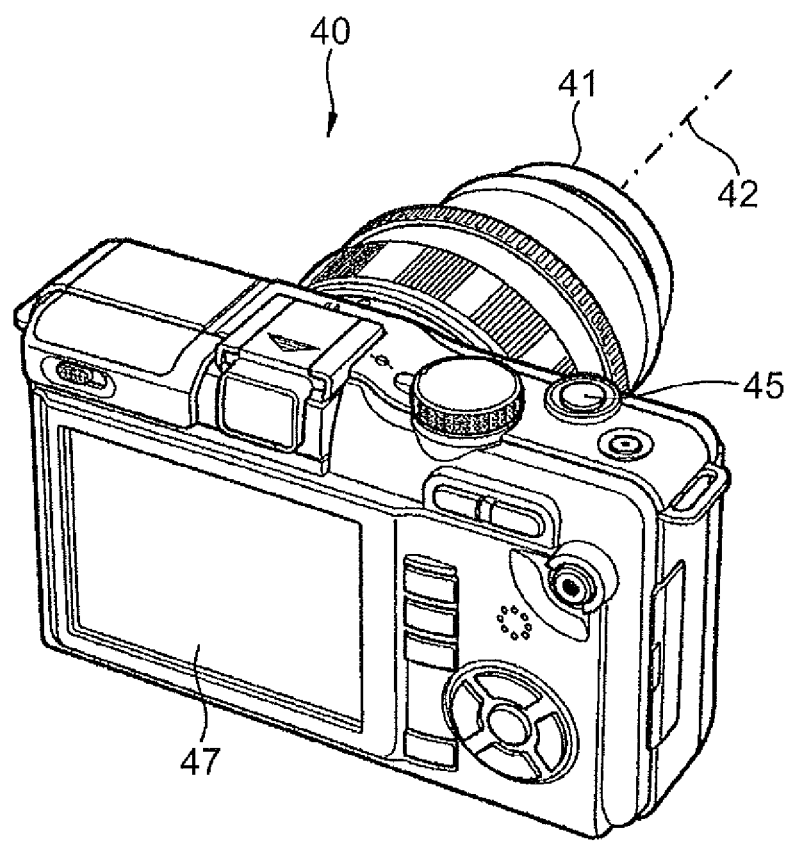
FIG. 9 is a rear perspective view of the image pickup apparatus.

FIG. 8 and FIG. 9 are conceptual diagrams of an arrangement of the image pickup apparatus having the telephoto lens described in the examples from the first example to the sixth example. FIG. 8 is a front perspective view showing an appearance of a single-lens mirrorless camera 40 as the image pickup apparatus, and FIG. 9 is a rear perspective view of the digital camera 40. The telephoto lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the telephoto lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 10:
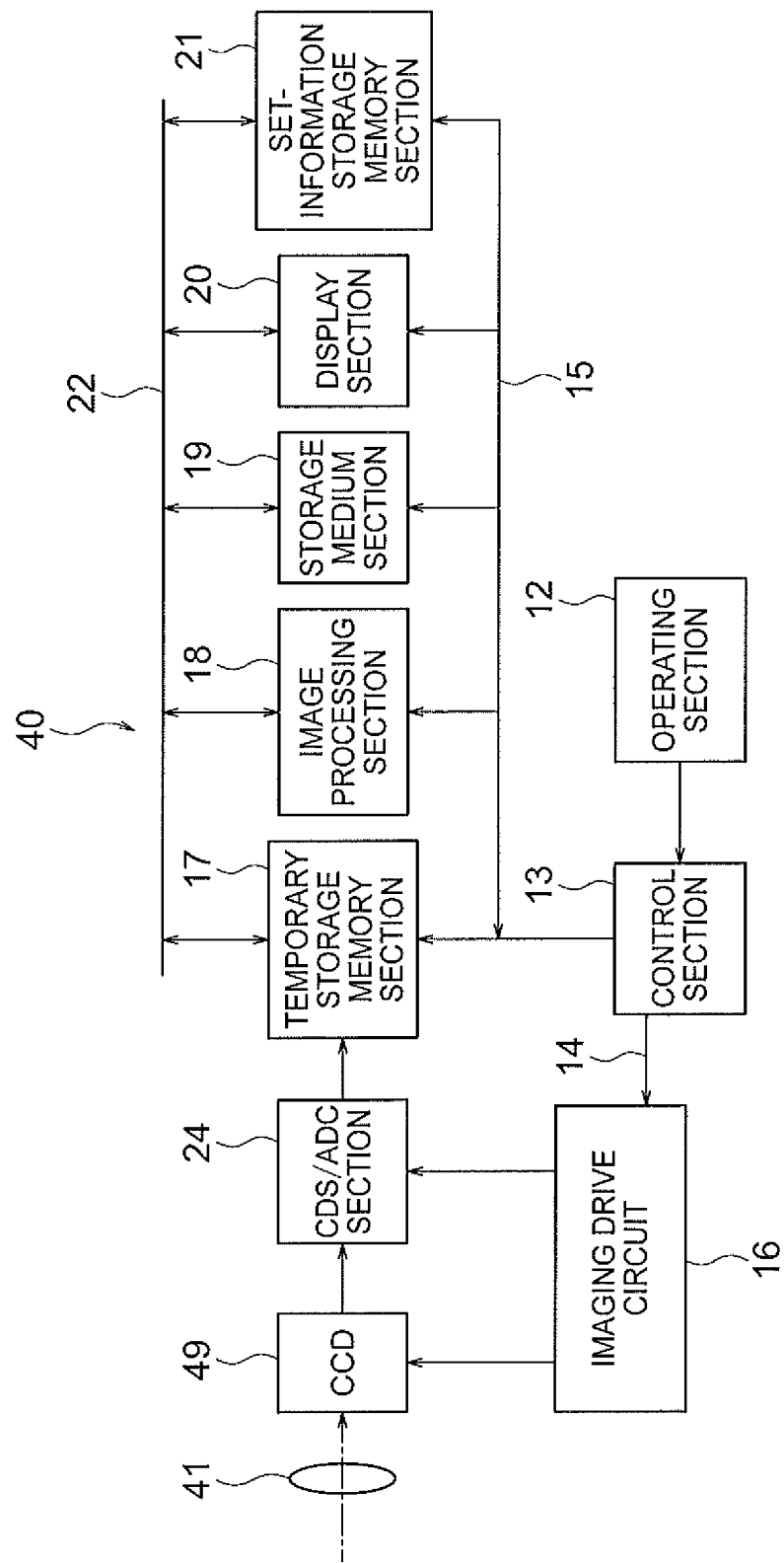
FIG. 10 is a structural block diagram of an internal circuit of main components of the image pickup apparatus.

FIG. 10 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 10, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By using the digital camera 40 arranged in such manner as the photographic optical system 41 in the telephoto lens of the present example, it is possible to let an image pickup apparatus to be an apparatus advantageous for achieving an image with high resolution without letting an image quality to degrade, while being a small-sized and light-weight.

The present invention shows an effect that it is possible to provide a telephoto lens in which a diameter of an optical system is made small, as well as occurrence of various aberrations is suppressed favorably, and an image pickup apparatus using such telephoto lens.

As heretofore mentioned, the present invention is suitable for a telephoto lens in which a diameter of an optical system is made small, as well as occurrence of various aberrations is suppressed favorably, and for an image pickup apparatus using such telephoto lens.

[Appended Mode 1-1]

A telephoto lens comprising in order from an object side to an image side:

a first lens unit having a positive refractive power;

a second lens unit having a negative refractive power; and a rear lens unit having a positive refractive power, wherein the first lens unit includes in order from the object side to the image side, a first sub-lens unit and a second sub-lens unit, and the following conditional expression (1) is satisfied:

$$0.4 < d_{su1o2}/d_{G1} < 0.8 \tag{1}$$

where, $d_{su1o2}$ denotes a distance on an optical axis from a surface on the object side of a lens positioned nearest to an object of the first sub-lens unit up to a surface on the object side of a lens positioned nearest to the object of the second sub-lens unit, and $d_{G1}$ denotes a distance on the optical axis of a surface on the object side of a lens positioned nearest to the object side of the first lens unit up to a surface on the image side of a lens positioned nearest to the image side of the first lens unit.

[Appended Mode 1-2]

The telephoto lens according to appended mode 1-1, wherein the following conditional expression (2) is satisfied:

$$0.4 < f_{su1}/f < 1.0 \tag{2}$$

where, $f_{su1}$ denotes a focal length of the first sub-lens unit, and $f$ denotes a focal length of the overall telephoto lens system at the time of focusing on an infinite object point.

[Appended Mode 1-3]

The telephoto lens according to appended mode 1-1 or 1-2, wherein the following conditional expression (3) is satisfied:

$$4 < f_{su1}/d_{su1i2} < 15 \tag{3}$$

where, $f_{su1}$ denotes the focal length of the first sub-lens unit, and $d_{su1i2}$ denotes a distance on an optical axis from a surface on an image of a lens positioned nearest to an image of the first sub-lens unit up to a surface on the object side of a lens positioned nearest to an object of the second sub-lens unit.

[Appended Mode 1-4]

The telephoto lens according to any one of appended modes 1-1 to 1-3, wherein the first lens unit has a third sub-lens unit on an image side of the second sub-lens unit.

[Appended Mode 1-5]

The telephoto lens according to appended mode 1-4, wherein a refractive power of the first sub-lens unit and a refractive power of the third sub-lens unit are both a positive refractive power.

[Appended Mode 1-6]

The telephoto lens according to appended mode 1-4 or 1-5, wherein the third sub-lens unit includes at least one positive lens which satisfies the following conditional expression (4):

$$16 < \nu_{su3pmin} < 55 \quad (4)$$

where, $\nu_{su3pmin}$ denotes a smallest Abbe's number from among Abbe's numbers of a positive lens in the third sub-lens unit.

[Appended Mode 1-7]

The telephoto lens according to any one of appended modes 1-4 to 1-6, wherein the following conditional expression (5) is satisfied:

$$0.35 < f_{su3}/f < 1 \quad (5)$$

where, $f_{su3}$ denotes a focal length of the third sub-lens unit, and f denotes a focal length of the overall telephoto lens system at the time of focusing on the infinite object point.

[Appended Mode 1-8]

The telephoto lens according to any one of appended modes 1-1 to 1-7, wherein the first sub-lens unit includes either one single lens or two single lenses.

[Appended Mode 1-9]

The telephoto lens according to any one of appended modes 1-1 to 1-8, wherein the second sub-lens unit includes in order from the object side to the image side, a negative lens, a positive lens, a positive lens, and a negative lens.

[Appended Mode 1-10]

The telephoto lens according to any one of appended modes 1-1 to 1-8, wherein the second sub-lens unit includes a cemented lens which is nearest to the object.

[Appended Mode 1-11]

The telephoto lens according to any one of appended modes 1-1 to 1-8, wherein the second sub-lens unit includes in order from the object side to the image side, an object-side cemented lens and an image-side cemented lens.

[Appended Mode 1-12]

The telephoto lens according to appended mode 1-11, wherein the object-side cemented lens in the second sub-lens unit includes in order from the object side to the image side, a negative single lens and a positive single lens, and the image-side cemented lens in the second sub-lens unit includes in order from the object side to the image side, a positive single lens and a negative single lens.

[Appended Mode 1-13]

The telephoto lens according to any one of appended modes 1-4 to 1-6, wherein the third sub-lens unit includes one lens component.

Here, the lens component is either a single lens or a cemented lens, and is a lens having two optically effective surfaces which are in contact with air.

[Appended Mode 1-14]

The telephoto lens according to any one of appended modes 1-1 to 1-13, wherein the rear lens unit includes a third lens unit having a positive refractive power, a fourth lens unit having a negative refractive power, and a fifth lens unit having a positive refractive power.

[Appended Mode 1-15]

The telephoto lens according to any one of appended modes 1-1 to 1-14, wherein the fourth lens unit includes a motion-blur reducing lens which moves in a direction perpendicular to an optical axis.

[Appended Mode 1-16]

The telephoto lens according to any one of appended modes 1-1 to 1-15, wherein a stop is disposed between the first lens unit and the second lens unit.

[Appended Mode 1-17]

The telephoto lens according to any one of appended modes 1-1 to 1-16, wherein at the time of focusing, the second lens unit moves in an optical axial direction.

[Appended Mode 1-18]

An image pickup apparatus comprising:

a telephoto lens according to any one of appended modes 1-1 to 1-17; and an image pickup element which has an image pickup surface, and which converts an image formed on the image pickup surface by the telephoto lens to an electric signal.

[Appended Mode 2-1]

A telephoto lens comprising in order from an object side:

a first unit having a positive refractive power;

a second unit having a negative refractive power; and a third unit having a positive refractive power, wherein a focusing from an infinite object point to an object point at a short distance is carried out by moving the second unit toward an image side, and the following conditional expression (17) is satisfied:

$$0.2 < Y_2/Y_{1a} < 0.32 \quad (17),$$

where, $Y_2$ denotes a maximum height of an axial light ray on a surface of incidence of the second unit, and $Y_{1a}$ denotes a maximum height of an axial light ray on a surface of incidence of the first unit.

[Appended Mode 2-2]

The telephoto lens according to appended mode 2-1, wherein the first unit includes in order from the object side, a $1a^{th}$ unit which includes one of one lens and two lenses, a $1b^{th}$ unit which includes a cemented lens of a negative lens and a positive lens and a cemented lens of a positive lens and a negative lens, and a $1c^{th}$ unit which includes one of a single lens and a cemented lens.

[Appended Mode 2-3]

The telephoto lens according to appended mode 2-2, wherein the following conditional expression (18) is satisfied:

$$0.55 < Y_{1b}/Y_{1a} < 0.85 \quad (18)$$

where, $Y_{1a}$ denotes the maximum height of an axial light ray on the surface of incidence of the first unit, and $Y_{1b}$ denotes a maximum height of an axial light ray on a surface of incidence of the $1b^{th}$ unit.

[Appended Mode 2-4]

The telephoto lens according to appended mode 2-1, wherein the second unit includes a cemented lens.

[Appended Mode 2-5]

The telephoto lens according to appended mode 2-1, wherein the third unit includes a $3a^{th}$ unit having a positive refractive power, a $3b^{th}$ unit having a negative refractive power, and a $3c^{th}$ unit having a positive refractive power, and the $3b^{th}$ unit includes a motion-blur reducing lens which moves in a direction perpendicular to an optical axis.

[Appended Mode 2-6]
The telephoto lens according to appended mode 2-5, wherein the $3a^{th}$ unit includes either a single lens or a cemented lens.

[Appended Mode 2-7]
The telephoto lens according to appended mode 2-5, wherein the $3b^{th}$ unit includes a cemented lens of positive lens and a negative lens, and a negative lens.

[Appended Mode 2-8]
The telephoto lens according to appended mode 2-5, wherein the $3c^{th}$ unit includes a cemented lens of a positive lens and a negative lens, and a cemented lens of a positive lens and a negative lens.

[Appended Mode 2-9]
The telephoto lens according to appended mode 2-5, wherein the following conditional expression (19) is satisfied:

$$75 < vd_{1bp} < 100 \tag{19}$$

where,
$vd_{1bp}$ denotes a minimum Abbe's number of the positive lens in the $1b^{th}$ unit.

[Appended Mode 2-10]
The telephoto lens according to appended mode 2-1, wherein the following conditional expression (20) is satisfied:

$$0.42 < D_{12}/D_1 < 0.75 \tag{20}$$

where,
$D_{12}$ denotes a distance from a surface of incidence of the $1a^{th}$ unit up to a surface of incidence of the $1b^{th}$ unit, and
$D_1$ denotes a distance from the surface of incidence of the $1a^{th}$ unit up to a surface of incidence of the $1c^{th}$ unit.

[Appended Mode 2-11]
An image pickup apparatus comprising:
a telephoto lens according to any one of appended modes 2-1 to 2-10; and
an image pickup element which has an image pickup surface, and which converts an image formed on the image pickup surface by the telephoto lens to an electric signal.

[Appended Mode 3-1]
A telephoto lens comprising in order from an object side to an image side:
a first lens unit having a positive refractive power;
a second lens unit having a negative refractive power; and
a rear lens unit having a positive refractive power, wherein
the rear lens unit includes a third lens unit having a positive refractive power, a fourth lens unit having a negative refractive power, and a fifth lens unit having a positive refractive power, and
the fifth lens includes in order from the object side to the image side, an object-side cemented lens and an image-side cemented lens.

[Appended Mode 3-2]
The telephoto lens according to appended mode 3-1, wherein the following conditional expression (8) is satisfied:

$$0.60 < \theta gF_{G5min} < 0.68 \tag{8}$$

where,
$\theta gF_{G5min}$ denotes a minimum $\theta gF$ of a negative lens in the fifth lens unit, where,
$\theta gF$ is a partial dispersion ratio, and is expressed by $\theta gF=(ng-nF)/(nF-nC)$, where,
nC, nF, and ng are refractive indices for a C-line, an F-line, and a g-line respectively.

[Appended Mode 3-3]
The telephoto lens according to appended mode 3-1 or 3-2, wherein the following conditional expression (9) is satisfied:

$$0.05 \leq f_{G5}/f \leq 0.15 \tag{9}$$

where,
$f_{G5}$ denotes a focal length of the fifth lens unit, and
f denotes a focal length of an overall telephoto lens system at the time of focusing on an infinite object point.

[Appended Mode 3-4]
The telephoto lens according to anyone of appended modes 3-1 to 3-3, wherein the following conditional expression (10) is satisfied:

$$0.65 < L_{TL}/f < 0.95 \tag{10}$$

where,
$L_{TL}$ denotes a distance from an object-side surface of a lens positioned nearest to an object of the telephoto lens up to an image plane at the time of focusing on the infinite object point, and
f denotes a focal length of an overall telephoto lens system at the time of focusing on the infinite object point.

[Appended Mode 3-5]
The telephoto lens according to anyone of appended modes 3-1 to 3-4, wherein
the object-side cemented lens in the fifth lens unit includes in order from the object side to the image side, a positive single lens and a negative single lens, and
the image-side cemented lens in the fifth lens unit includes in order from the object side to the image side, a positive single lens and a negative single lens.

[Appended Mode 3-6]
The telephoto lens according to anyone of appended modes 3-1 to 3-5, wherein the fourth lens unit includes a motion-blur reducing lens which moves in a direction perpendicular to an optical axis.

[Appended Mode 3-7]
The telephoto lens according to anyone of appended modes 3-1 to 3-6, wherein the first lens unit includes in order from the object side to the image side, a first sub-lens unit and a second sub-lens unit.

[Appended Mode 3-8]
The telephoto lens according to appended mode 3-7, wherein the first lens unit has a third sub-lens unit on an image side of the second sub-lens unit.

[Appended Mode 3-9]
The telephoto lens according to appended mode 3-8, wherein a refractive power of the first sub-lens unit and a refractive power of the third sub-lens unit are both a positive refractive power.

[Appended Mode 3-10]
The telephoto lens according to any one of appended modes 3-1 to 3-9, wherein a stop is disposed between the first lens unit and the second lens unit.

[Appended Mode 3-11]
The telephoto lens according to any one of appended modes 3-1 to 3-10, wherein at the time of focusing, the second lens unit moves in an optical axial direction.

[Appended Mode 3-12]
The telephoto lens according to any one of appended modes 3-1 to 3-11, wherein
the third lens unit includes one lens component.
Here, the lens component is either a single lens or a cemented lens, and is a lens having two optically effective surfaces which are in contact with air.

[Appended Mode 3-13]

An image pickup apparatus comprising:

a telephoto lens according to any one of appended modes 3-1 to 3-12; and an image pickup element which has an image pickup surface, and which converts an image formed on the image pickup surface by the telephoto lens to an electric signal.

[Appended Mode 4-1]

A telephoto lens comprising in order from an object side to an image side:

a first lens unit having a positive refractive power;

a second lens unit having a negative refractive power; and a rear lens unit having a positive refractive power, wherein the rear lens unit includes a third lens unit having a positive refractive power, a fourth lens unit having a negative refractive power, and a fifth lens unit having a positive refractive power, and the first lens unit includes at least one cemented lens, and at least one cemented lens includes at least one positive lens, and the following conditional expression (15B) is satisfied:

$$85 < v_{sub2op} < 100 \quad (15B)$$

where, $v_{sub2op}$ denotes Abbe's number for at least one positive lens in at least one cemented lens.

[Appended Mode 4-2]

The telephoto lens according to appended modes 4-1, wherein the fourth lens unit includes a motion-blur reducing lens which moves in a direction perpendicular to an optical axis.

[Appended Mode 4-3]

The telephoto lens according to appended mode 4-1 or 4-2, wherein the first lens unit includes in order from the object side to the image side, a first sub-lens unit and a second sub-lens unit.

[Appended Mode 4-4]

The telephoto lens according to appended modes 4-3, wherein the first lens unit has a third sub-lens unit on an image side of the second sub-lens unit.

[Appended Mode 4-5]

The telephoto lens according to appended mode 4-4, wherein a refractive power of the first sub-lens unit and a refractive power of the third sub-lens unit are both a positive refractive power.

[Appended Mode 4-6]

The telephoto lens according to any one of appended modes 4-1 to 4-5, wherein a stop is disposed between the first lens unit and the second lens unit.

[Appended Mode 4-7]

The telephoto lens according to any one of appended modes 4-1 to 4-6, wherein at the time of focusing, the second lens unit moves in an optical axial direction.

[Appended Mode 4-8]

The telephoto lens according to anyone of appended modes 4-1 to 4-7, wherein the third lens unit includes one lens component.

[Appended Mode 4-9]

The telephoto lens according to anyone of appended modes 4-1 to 4-8, wherein the following conditional expression (11) is satisfied:

$$0.4 < f_{G1}/f < 0.5 \quad (11)$$

where, $f_{G1}$ denotes the focal length of the first lens unit, and f denotes the focal length of the overall telephoto lens system at the time of focusing on the infinite object point.

[Appended Mode 4-10]

The telephoto lens according to anyone of appended modes 4-1 to 4-9, wherein the following conditional expression (12) is satisfied:

$$-0.25 < f_{G2}/f < -0.1 \quad (12)$$

where, $f_{G2}$ denotes a focal length of the second lens unit, and f denotes the focal length of the overall telephoto lens system at the time of focusing on the infinite object point.

[Appended Mode 4-11]

The telephoto lens according to anyone of appended modes 4-1 to 4-10, wherein the following conditional expression (13) is satisfied:

$$0.1 < f_{G3}/f < 0.3 \quad (13)$$

where, $f_{G3}$ denotes a focal length of the third lens unit, and f denotes a focal length of the overall telephoto lens system at the time of focusing on the infinite object point.

[Appended Mode 4-12]

The telephoto lens according to anyone of appended modes 4-1 to 4-11, wherein the following conditional expression (14) is satisfied:

$$-0.1 < f_{G4}/f < -0.03 \quad (14)$$

where, $f_{G4}$ denotes the focal length of the fourth lens unit, and f denotes the focal length of the overall telephoto lens system at the time of focusing on the infinite object point.

[Appended Mode 4-13]

An image pickup apparatus comprising:

a telephoto lens according to any one of appended modes 4-1 to 4-12; and an image pickup element which has an image pickup surface, and which converts an image formed on the image pickup surface by the telephoto lens to an electric signal.

[Appended Mode 5-1]

A telephoto lens comprising in order from an object side to an image side:

a first lens unit having a positive refractive power;

a second lens unit having a negative refractive power; and a rear lens unit having a positive refractive power, wherein the first lens unit includes a first cemented lens and a second cemented lens, and a lens component having a positive refractive power is disposed on the image side of the first cemented lens and the second cemented lens, and the first cemented lens includes at least one positive lens, and the following conditional expression (15C) is satisfied:

$$85 < v_{sub2op} < 100 \quad (15C)$$

where, $v_{sub2op}$ denotes Abbe's number for at least one positive lens in the first cemented lens, and the lens component is either a single lens or a cemented lens, and is a lens having two optically effective surfaces which are in contact with air.

[Appended Mode 5-2]

The telephoto lens according to appended mode 5-1, wherein the second cemented lens includes at least one positive lens, and the following conditional expression (16B) is satisfied:

$$70 < v_{sub2ip} < 100 \quad (16B)$$

where, $v_{sub2ip}$ denotes Abbe's number for at least one positive lens in the second cemented lens.

[Appended Mode 5-3]

The telephoto lens according to appended mode 5-1 or 5-2, wherein the rear lens unit includes a third lens unit having a positive refractive power, a fourth lens unit having a negative refractive power, and a fifth lens unit having a positive refractive power.

[Appended Mode 5-4]

The telephoto lens according to any one of appended modes 5-1 to 5-3, wherein the fourth lens unit includes a motion-blur reducing lens which moves in a direction perpendicular to an optical axis.

[Appended Mode 5-5]

The telephoto lens according to any one of appended modes 5-1 to 5-4, wherein the first lens unit includes in order from the object side to the image side, a first sub-lens unit and a second sub-lens unit.

[Appended Mode 5-6]

The telephoto lens according to 5-5, wherein the first lens unit has a third sub-lens unit on an image side of the second sub-lens unit.

[Appended Mode 5-7]

The telephoto lens according to anyone of appended modes 5-1 to 5-6, wherein a stop is disposed between the first lens unit and the second lens unit.

[Appended Mode 5-8]

The telephoto lens according to anyone of appended modes 5-1 to 5-7, wherein at the time of focusing, the second lens unit moves in an optical axial direction.

[Appended Mode 5-9]

The telephoto lens according to anyone of appended modes 5-1 to 5-8, wherein
the third lens unit includes one lens component.

[Appended Mode 5-10]

The telephoto lens according to anyone of appended modes 5-1 to 5-9, wherein the following conditional expression (11) is satisfied:

$$0.4 < f_{G1}/f < 0.5 \quad (11)$$

where, $f_{G1}$ denotes the focal length of the first lens unit, and
f denotes the focal length of the overall telephoto lens system at the time of focusing on the infinite object point.

[Appended Mode 5-11]

The telephoto lens according to anyone of appended modes 5-1 to 5-10, wherein the following conditional expression (12) is satisfied:

$$-0.25 < f_{G2}/f < -0.1 \quad (12)$$

where, $f_{G2}$ denotes a focal length of the second lens unit, and
f denotes the focal length of the overall telephoto lens system at the time of focusing on the infinite object point.

[Appended Mode 5-12]

The telephoto lens according to anyone of appended modes 5-1 to 5-11, wherein the following conditional expression (13) is satisfied:

$$0.1 < f_{G3}/f < 0.3 \quad (13)$$

where, $f_{G3}$ denotes a focal length of the third lens unit, and
f denotes a focal length of the overall telephoto lens system at the time of focusing on the infinite object point.

[Appended Mode 5-13]

The telephoto lens according to anyone of appended modes 5-1 to 5-12, wherein the following conditional expression (14) is satisfied:

$$-0.1 < f_{G4}/f < -0.03 \quad (14)$$

where, $f_{G4}$ denotes a focal length of the fourth lens unit, and
f denotes the focal length of the overall telephoto lens system at the time of focusing on the infinite object point.

[Appended Mode 5-14]

An image pickup apparatus comprising:
a telephoto lens according to any one of appended modes 5-1 to 5-13; and
an image pickup element which has an image pickup surface, and which converts an image formed on the image pickup surface by the telephoto lens to an electric signal.

What is claimed is:

1. A telephoto lens comprising in order from an object side:
a first unit having a positive refractive power;
a second unit having a negative refractive power; and
a third unit having a positive refractive power, wherein
the first unit includes in order from the object side: a $1a^{th}$ unit which includes one of one lens and two lenses, a $1b^{th}$ unit which includes a cemented lens of a negative lens and a positive lens and a cemented lens of a positive lens and a negative lens, and a $1c^{th}$ unit which includes one of a single lens and a cemented lens,
a focusing from an infinite object point to an object point at a short distance is carried out by moving the second unit toward an image side, and
the following conditional expressions (17) and (20) are satisfied:

$$0.2 < Y_2/Y_{1a} < 0.32 \quad (17), \text{ and}$$

$$0.42 < D_{12}/D_1 < 0.75 \quad (20),$$

where, $Y_2$ denotes a maximum height of an axial light ray on a surface of incidence of the second unit,
$Y_{1a}$ denotes a maximum height of an axial light ray on a surface of incidence of the first unit,
$D_{12}$ denotes a distance from a surface of incidence of a lens positioned nearest to an object in the $1a^{th}$ unit up to a surface of incidence of a lens positioned nearest to an object in the $1b^{th}$ unit, and
$D_1$ denotes a distance from the surface of incidence of a lens positioned nearest to an object in the $1a^{th}$ unit up to a surface of emergence of a lens positioned nearest to an image in the $1c^{th}$ unit.

2. The telephoto lens according to claim 1, wherein the following conditional expression (18) is satisfied:

$$0.55 < Y_{1b}/Y_{1a} < 0.85 \quad (18)$$

where, $Y_{1a}$ denotes the maximum height of an axial light ray on the surface of incidence of the first unit, and
$Y_{1b}$ denotes a maximum height of an axial light ray on a surface of incidence of the $1b^{th}$ unit.

3. The telephoto lens according to claim 1, wherein the second unit includes a cemented lens.

4. The telephoto lens according to claim 1, wherein
the third unit includes a $3a^{th}$ unit having a positive refractive power, a $3b^{th}$ unit having a negative refractive power, and a $3c^{th}$ unit having a positive refractive power, and the $3b^{th}$ unit includes a motion-blur reducing lens which moves in a direction perpendicular to an optical axis.

5. The telephoto lens according to claim 4, wherein the $3a^{th}$ unit includes either a single lens or a cemented lens.

6. The telephoto lens according to claim 4, wherein the $3b^{th}$ unit includes a cemented lens of positive lens and a negative lens, and a negative lens.

7. The telephoto lens according to claim 4, wherein the $3c^{th}$ unit includes a cemented lens of a positive lens and a negative lens, and a cemented lens of a positive lens and a negative lens.

8. The telephoto lens according to claim 4, wherein the following conditional expression (19) is satisfied:

$$75 < vd_{1bp} < 100 \tag{19}$$

where, $vd_{1bp}$ denotes a minimum Abbe's number of the positive lens in the $1b^{th}$ unit.

9. An image pickup apparatus comprising:
a telephoto lens according to claim 1; and
an image pickup element which has an image pickup surface, and which converts an image formed on the image pickup surface by the telephoto lens to an electric signal.

10. A telephoto lens comprising in order from an object side to an image side:
a first lens unit having a positive refractive power;
a second lens unit having a negative refractive power; and
a rear lens unit having a positive refractive power, wherein
the rear lens unit includes a third lens unit having a positive refractive power, a fourth lens unit having a negative refractive power, and a fifth lens unit having a positive refractive power,
the fifth lens unit includes in order from the object side to the image side, an object-side cemented lens and an image-side cemented lens,
no lens and only an aperture stop is disposed between a lens positioned nearest to an image in the first lens unit and a lens positioned nearest to an object in the second lens unit, and
at a time of focusing, the second unit moves along an optical axis.

11. The telephoto lens according to claim 10, wherein the following conditional expression (8) is satisfied:

$$0.60 < \theta g F_{G5min} < 0.68 \tag{8}$$

where, $\theta g F_{G5min}$ denotes a minimum $\theta gF$ of a negative lens in the fifth lens unit, where,
$\theta gF$ is a partial dispersion ratio, and is expressed by $\theta gF = (ng-nF)/(nF-nC)$, where,
nC, nF, and ng are refractive indices for a C-line, an F-line, and a g-line respectively.

12. The telephoto lens according to claim 10, wherein the following conditional expression (9) is satisfied:

$$0.05 \le f_{G5}/f \le 0.15 \tag{9}$$

where, $f_{G5}$ denotes a focal length of the fifth lens unit, and
f denotes a focal length of an overall telephoto lens system at the time of focusing on an infinite object point.

13. The telephoto lens according to claim 10, wherein the following conditional expression (10) is satisfied:

$$0.65 < L_{TL}/f < 0.95 \tag{10}$$

where, $L_{TL}$ denotes a distance from an object-side surface of a lens positioned nearest to an object of the telephoto lens up to an image plane at the time of focusing on the infinite object point, and
f denotes a focal length of an overall telephoto lens system at the time of focusing on the infinite object point.

14. The telephoto lens according to claim 10, wherein
the object-side cemented lens in the fifth lens unit includes in order from the object side to the image side, a positive single lens and a negative single lens, and
the image-side cemented lens in the fifth lens unit includes in order from the object side to the image side, a positive single lens and a negative single lens.

15. The telephoto lens according to claim 10, wherein the fourth lens unit includes a motion-blur reducing lens which moves in a direction perpendicular to an optical axis.

16. The telephoto lens according to claim 10, wherein the first lens unit includes in order from the object side to the image side, a first sub-lens unit and a second sub-lens unit.

17. The telephoto lens according to claim 16, wherein the first lens unit has a third sub-lens unit on an image side of the second sub-lens unit.

18. The telephoto lens according to claim 17, wherein a refractive power of the first sub-lens unit and a refractive power of the third sub-lens unit are both a positive refractive power.

19. The telephoto lens according to claim 10, wherein a stop is disposed between the first lens unit and the second lens unit.

20. The telephoto lens according to claim 10, wherein at the time of focusing, the second lens unit moves in an optical axial direction.

21. The telephoto lens according to claim 10, wherein
the third lens unit includes one lens component,
wherein, the lens component is either a single lens or a cemented lens, and is a lens having two optically effective surfaces which are in contact with air.

22. An image pickup apparatus comprising:
a telephoto lens according to claim 10; and
an image pickup element which has an image pickup surface, and which converts an image formed on the image pickup surface by the telephoto lens to an electric signal.

* * * * *